United States Patent
Wade et al.

(10) Patent No.: US 8,492,160 B1
(45) Date of Patent: Jul. 23, 2013

(54) BIOMARKER SENSORS AND METHOD FOR MULTI-COLOR IMAGING AND PROCESSING OF SINGLE-MOLECULE LIFE SIGNATURES

(75) Inventors: Lawrence A. Wade, La Canada, CA (US); Charles Patrick Collier, Oak Ridge, TN (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 396 days.

(21) Appl. No.: 12/720,103

(22) Filed: Mar. 9, 2010

Related U.S. Application Data

(62) Division of application No. 11/273,967, filed on Nov. 14, 2005, now abandoned.

(60) Provisional application No. 60/627,874, filed on Nov. 15, 2004.

(51) Int. Cl.
*G01N 1/28* (2006.01)
*C12N 13/00* (2006.01)

(52) U.S. Cl.
USPC ............... 436/163; 422/174; 422/43; 422/46; 435/173.1; 435/173.4

(58) Field of Classification Search
USPC .................. 436/163, 174, 43, 46; 435/173.1, 435/173.4
See application file for complete search history.

(56) References Cited

U.S. PATENT DOCUMENTS

| | | | | |
|---|---|---|---|---|
| 5,376,249 | A * | 12/1994 | Afeyan et al. | 204/452 |
| 6,033,913 | A * | 3/2000 | Morozov et al. | 436/86 |
| 6,649,419 | B1 * | 11/2003 | Anderson | 436/526 |
| 6,686,207 | B2 * | 2/2004 | Tupper et al. | 436/174 |
| 6,730,905 | B2 * | 5/2004 | Nakagawa et al. | 850/61 |
| 6,932,895 | B2 * | 8/2005 | Anderson et al. | 204/613 |
| 6,932,940 | B2 * | 8/2005 | Amirkhanian | 422/82.07 |
| 7,373,968 | B2 * | 5/2008 | Oldenburg | 165/200 |
| 7,435,384 | B2 * | 10/2008 | Fish | 422/82.02 |
| 2003/0050437 | A1 * | 3/2003 | Montgomery | 530/334 |
| 2004/0014240 | A1 * | 1/2004 | Takeguchi et al. | 436/518 |
| 2005/0034849 | A1 * | 2/2005 | Oldenburg | 165/253 |
| 2007/0264623 | A1 * | 11/2007 | Wang et al. | 435/4 |
| 2010/0101955 | A1 * | 4/2010 | Nocera et al. | 204/547 |
| 2010/0112546 | A1 * | 5/2010 | Lieber et al. | 435/5 |
| 2010/0317118 | A1 * | 12/2010 | Masujima et al. | 436/63 |
| 2012/0025330 | A1 * | 2/2012 | Lim et al. | 257/414 |

* cited by examiner

*Primary Examiner* — Brian R Gordon
(74) *Attorney, Agent, or Firm* — Mark Homer

(57) ABSTRACT

The invention is a device including array of active regions for use in reacting one or more species in at least two of the active regions in a sequential process, e.g., sequential reactions. The device has a transparent substrate member, which has a surface region and a silane material overlying the surface region. A first active region overlies a first portion of the silane material. The first region has a first dimension of less than 1 micron in size and has first molecules capable of binding to the first portion of the silane material. A second active region overlies a second portion of the silane material. The second region has a second dimension of less than 1 micron in size, second molecules capable of binding to the second portion of the active region, and a spatial distance separates the first active region and the second active region.

11 Claims, 13 Drawing Sheets

BIOMARKER SENSORS AND METHOD FOR MULTI-COLOR IMAGING AND PROCESSING OF SINGLE-MOLECULE LIFE SIGNATURES

CROSS-REFERENCES TO RELATED APPLICATIONS

This application claims priority to U.S. Provisional Application No. 60/627,874 filed on Nov. 15, 2004, and U.S. application Ser. No. 11/273.967, of which this is a Divisional Application thereof, which are hereby incorporated by reference herein in their entirety for all purposes.

STATEMENT AS TO RIGHTS TO INVENTIONS MADE UNDER FEDERALLY SPONSORED RESEARCH OR DEVELOPMENT

The invention described herein was made in the performance of work under a NASA contract, and is subject to the provisions of Public Law 96-517 (35 USC 202) in which the Contractor has not elected to retain title.

BACKGROUND OF THE INVENTION

The present invention relates generally to printing techniques for the manufacture of active array regions. More particularly, the present invention provides a method and system for dispensing one or more entities using a nano-lithography technique for biomarker sensors. Merely by way of example, the invention has been applied to dispensing one or more patterns of monolayers of materials and even single molecule entities using an atomic force microscope tip(s), commonly called Dip-Pen Nanolithography ("DPN"), which is a direct-write printing technique. But it would be recognized that the invention has a much broader range of applicability.

As time progressed, a variety of printing techniques have been developed. From the early days, printing relied upon certain basic elements including ink, paper, and machined surfaces, which bear text and/or images in relief that were transferred onto the paper. Ink coated steel plates were often used as the surfaces that transferred the text and/or images onto paper. Other printing techniques developed include lithography, typography, xylography, and conventional forms of ink jet printing, often used with computer applications.

Other types of printing techniques have been used to form one or more arrays of biological materials (including molecular probes) onto surfaces of substrates. The array of biological materials formed on the substrate is often called a "biological chips." Certain types of biological chips include certain spatial regions on the order of about tens of microns in scale. These chips have been useful to determine whether one or more target molecules interact with one or more probe molecules on the biological chip.

Conventional biological chips have been used for certain types of screening techniques. Such screening techniques can be useful for determining information about either or both the probe and/or target molecules. As merely an example, a specific library of peptides used as probes can screen for one or more drugs. The peptides can be exposed to a receptor, and those probes that bind to the receptor can be identified using certain techniques. Although highly successful, these techniques are often limited in an ability to create smaller and smaller regions of biological materials.

Various limitations exist with these conventional techniques. For example, these techniques often have limited resolution and can be reduced to certain spatial sizes. Additionally, certain types of materials are often difficult and/or even incompatible with applications to other types of substrate structures. Furthermore, these techniques often cannot provide adequate spacing between the materials themselves to carry out sequential reactions in an efficient manner. These and other limitations are described throughout the present specification and more particularly below.

From the above, it is seen that an improved technique for printing patterns of chemical and/or biological entities in a spatial manner are desired.

BRIEF SUMMARY OF THE INVENTION

According to the present invention, techniques for printing one or more patterns using mono-layers of materials are provided. More particularly, the present invention provides a method and system for dispensing one or more entities using a nano-lithography technique for biomarker sensors. Merely by way of example, the invention has been applied to dispensing one or more patterns of monolayers of materials and even single molecule entities using an atomic force microscope tip(s), commonly called Dip-Pen Nanolithography ("DPN"), which is a direct-write printing technique. But it would be recognized that the invention has a much broader range of applicability. For example, the invention can be applied to formation of patterns using biological materials, chemical materials, metal materials, polymer materials, solid state materials, small molecules (e.g., molecule structures of 100 atoms and less), dendrimers, DNA, proteins, semiconductors, insulators, organic thin films, inorganic thin films, any combination of these, and the like. Additionally, the method and applications can be from a variety of different fields such as electronics, semiconductor, inorganic chemistry, organic chemistry, life sciences, medical and diagnostics, life style, security, petroleum, agricultural, biotechnology, financial, molecular interaction, and others.

In a specific embodiment, the present invention provides a device comprising an array of active regions for use in reacting one or more species in at least two of the active regions in a sequential process, e.g., sequential reactions. The device has a transparent substrate member, which has a surface region. In a specific embodiment, the substrate can be homogeneous and/or layered and/or a composite. The substrate can be a glass, quartz, silicon, plastic, any combination of these, and the like, according to a specific embodiment. The device has a silane material overlying the surface region. The device has a first active region formed overlying a first portion of the silane material. In a specific embodiment, the first active region has a first dimension of less than 1 micron in size and has one or more first molecules capable of binding to the first portion of the silane material. In a specific embodiment, the device has a second active region formed overlying a second portion of the silane material. The second active region has a second dimension of less than 1 micron in size and has one or more second molecules capable of binding to the second portion of the active region. In a specific embodiment, the device has a spatial distance separating the first active region and the second active region. In a preferred embodiment, the spatial distance is characterized by a dimension of 1 micron and less. The device has a fluid material in contact with the first active region, the second active region, and the spatial distance according to a specific embodiment. The device also has a reactant species within the fluid material. The reactant species is capable of spatially moving from the first active region to the second active region over the spatial distance of 1 micron and less within a time of less than 10 microseconds.

In a specific embodiment, the present invention provides a method for processing an array of active regions for use in reacting one or more species in at least two of the active regions in a sequential process. The method includes providing a substrate member, which has at least a surface region, a first active region formed overlying a first portion of the surface region, and a second active region formed overlying a second portion of the surface region. In a preferred embodiment, a spatial distance separates the first active region and the second active region. In a preferred embodiment, the spatial distance is characterized by dimension of 1 micron and less. The method subjects the first active region, the second active region, and the spatial distance with a fluid material. The method dispenses a reactant species within the fluid material and causes movement of the reactant species from the first active region to the second active region over the spatial distance of 1 micron and less within a time of less than 10 microseconds.

In a specific embodiment, the present invention provides a method for processing one or more materials using a probe device, e.g., AFM probe. The method includes suspending a probe device coupled to a tip region (e.g., single walled nanotube), which has a determined spatial size, e.g., a few nanometers and less. The method includes moving the probe device including the tip region toward a surface of a substrate member having one or more species thereon, while maintaining the tip region immersed in a fluid (e.g., pH neutral solution, acid solution, basic solution, organic solution) overlying the one or more species thereon. The method includes applying an electrical bias on the probe device relative to a reference potential to cause the tip region to change in electrical characteristic. The method includes selectively processing the one or more species. In a preferred embodiment, the selective processing occurs at a localized region of the one or more species, although there also may be global processing according to the application.

In a specific embodiment, the present invention includes a system for processing one or more local regions on substrate members, e.g., glass, plastic, quartz, silicon, gelled, solid, ceramic. The system has a suspension member, e.g., arm. A probe device is coupled to the suspension member. In a specific embodiment, the probe device is coupled to a tip region, which has a determined spatial size. In a specific embodiment, the probe device (including the tip region) is adapted to move toward a surface of a substrate member having one or more species thereon. The system has an electrical drive device coupled to the probe device. In a specific embodiment, the electrical drive device is adapted to apply an electrical bias to the probe device relative to a reference potential (e.g., ground, other potential (at a region (e.g., substrate, fluid, housing wall)) to cause the tip region to change in electrical characteristic to cause a localized change within a vicinity (e.g., near, on and in contact) of the one or more species. Depending upon the embodiment, a single molecule entity may be subject to the localized change. The system has a fluid immersing the tip region as the tip region moves toward the surface. In a specific embodiment, the fluid includes a local region, which is subjected to the localized change. In a specific embodiment, the localized change is a change in a pH characteristic (or other characteristic) of the local region of the fluid upon at least application of the electrical bias of the probe device from the electrical drive device.

Numerous benefits can be achieved using the present invention over conventional techniques. As merely an example, the present invention can provide for an array of molecules having a spot size of about 1 micron and less according to a specific embodiment. Additionally, the present method and device can also include a spatial separation distance of about 1 micron and less between any pair of spots according to an embodiment of the present invention. The present techniques can also lead to improved throughput, efficiency, and yield according to a specific embodiment. Still further, the present methods and systems provides for one or more self-assembled monolayers of deposited materials and/ or single molecular entities overlying a substrate surface (which were previously incompatible with each other) according to a specific embodiment. Other benefits can also be achieved according to a specific embodiment.

According to a specific embodiment, the present method and system can also provide for a specific pH environment. In some cases it is the reaction itself that is made possible using a specific pH environment. In other cases it is the equilibrium concentrations that are affected by pH. Control of pH, either at the molecular distance scale (nanoscale) or within small, confined volumes, is desirable for biosystems to achieve highly efficient fabrication of peptides, oligomers, polymers, oligosaccharides, nucleic acids and ribonucleic acids, e.g., four oligo. In a specific embodiment, the method and system also provides for being able to have chemical flexibility to achieve certain complexity of processes. Cells take advantage of the strategy of creating and then maintaining specific pH levels in organelles such as the Lysosome. Such compartmentalization according to an embodiment of the present invention enables families of compounds to be created and reactions to occur at high rate, which would be highly unfavorable elsewhere in the cell.

Similarly, we often refer to molecules such as proteins, or an assembly of such molecules, that locally manipulate the environment on the nanoscale as an enzyme due to their ability to catalytically enhance the rate of a reaction in one or more applications. Catalysts increase the rate of a reaction by stabilizing the transient states. A strategy for such enigmatic activity, typical of metal ion catalysis, is for the metal ion to generate a nucleophile by increasing the acidity of a nearby molecule such as water in the hydration of $CO_2$ by carbonic anhydrase II (see for example, Biochemistry, by J. M. Berg, J. L. Tymoczko and L. Stryer, Fifth edition, Chapter 9). The rate of bicarbonate formation is greatly increased by carbonic anhydrase II through combining regions for binding the carbon dioxide substrate near to where the zinc atom generates hydroxide ions by facilitating the release of a proton from a water molecule. Depending upon the embodiment, the present method and system can be used to facilitate these applications. Other applications can also exist according to a specific embodiment.

In a specific embodiment, the present invention provides a method and system to enables local, sharp pH gradients (e.g., localized within a vicinity of one or more molecules and/or structures) in a small volume including enzymatic and substrate proteins or molecules to catalytically drive reactions in a favorable direction. For example, electron donation can be used to change protein folding and pH changes enable the formation of nucleic acids (e.g. methylated adenine and cysteine bases are common in human DNA) with different structural and chemical properties than the normal bases. This later change is desirable to understanding the full versatility of the human genome: pH enabled amino-imino and keto-enol transitions can used to significantly change DNA base structure. Depending upon the embodiment, one or more of these benefits may be achieved. These and other benefits are described throughout the present specification and more particularly below.

From the above, it is seen that techniques for improving ways to manufacturing probe designs for microscopes are highly desired.

DETAILED DESCRIPTION OF THE INVENTION

According to the present invention, techniques for printing one or more patterns using monolayers of materials are provided. More particularly, the present invention/provides a method and system for dispensing one or more entities using a nano-lithography technique for biomarker sensors. Merely by way of example, the invention has been applied to dispensing one or more patterns of monolayers of materials and even single molecule entities using an atomic force microscope tip(s), commonly called Dip-Pen Nanolithography ("DPN"), which is a direct-write printing technique. But it would be recognized that the invention has a much broader range of applicability. For example, the invention can be applied to formation of patterns using biological materials, chemical materials, metal materials, polymer materials, solid state materials, small molecules (e.g., molecule structures of 100 atoms and less), dendrimers. DNA, proteins, semiconductors, insulators, organic thin films, inorganic thin films, any combination of these, and the like. Additionally, the method and applications can be from a variety of different fields such as electronics, semiconductor, inorganic chemistry, organic chemistry, life sciences, medical and diagnostics, life style, security, petroleum, agricultural, biotechnology, financial, molecular interaction, and others.

Figure 1:
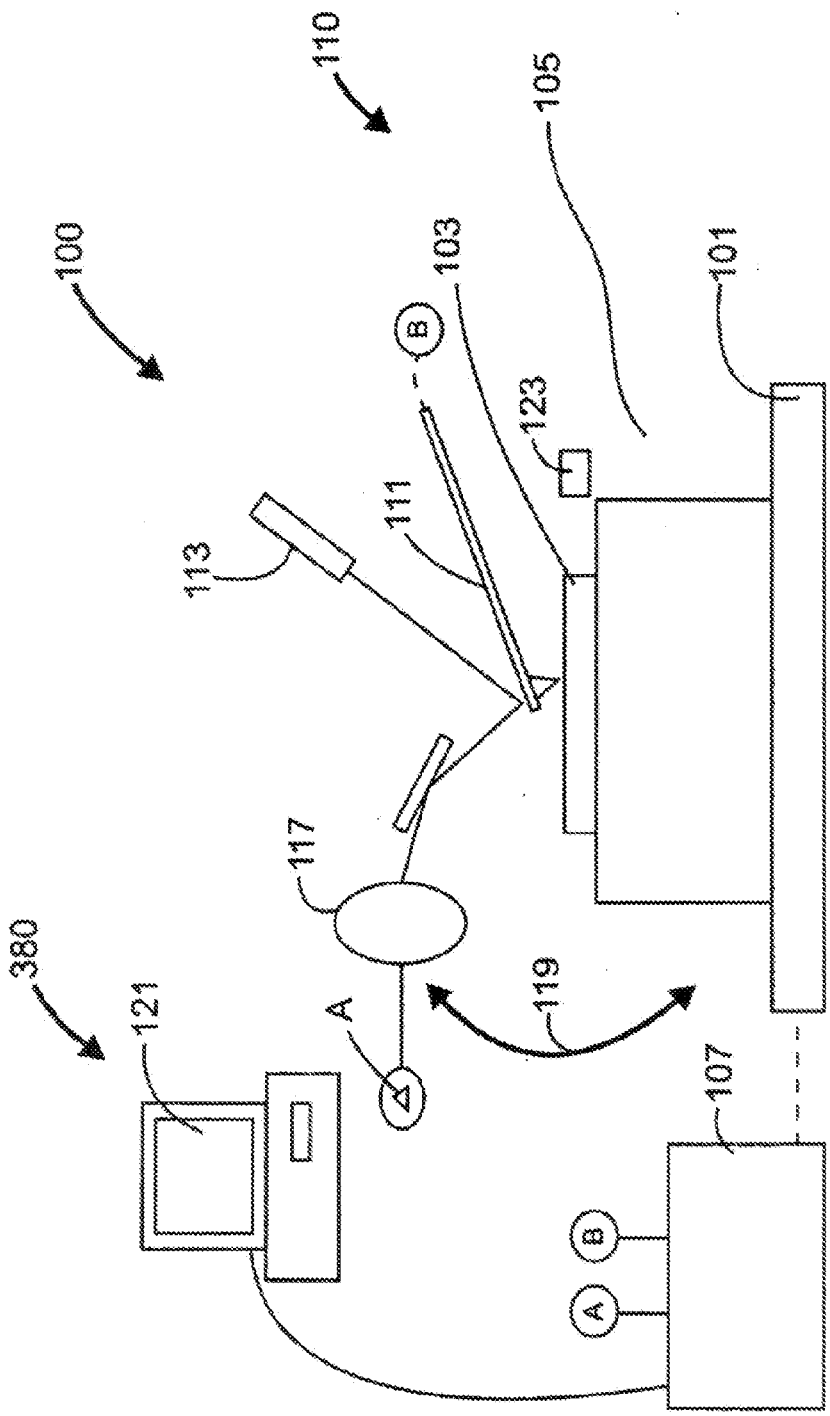
FIG. 1 is a simplified diagram of a Dip-Pen nanolithography system according to an embodiment of the present invention.

FIG. 1 is a simplified diagram of a Dip-Pen nanolithography system 100 according to an embodiment of the present invention. This diagram is merely an example, which should not unduly limit the scope of the claims herein. One of ordinary skill in the art would recognize many variations, alternatives, and modifications. As shown, the system is preferably a scanning system 100 according to a specific embodiment. This diagram is merely an example, which should not unduly limit the scope of the claims herein. One of ordinary skill in the art would recognize many other modifications, alternatives, and variations. As shown, the present system 100 includes a mobile stage 101, which has x-y-z movement capability. The stage can be moved with a tolerance of less than 40 microns for sample positioning and when used for alignment can be moved with a tolerance of <1 nm. A sample 103 is placed on the stage. Additionally, the stage can provide a scanning speed ranging from about 0.1 Hz to about 12.2 Hz and/or others according to a specific embodiment. In a specific embodiment, the stage relative to the probe can be moved a rate of about 0.0004 and greater millimeters per second according to a specific embodiment, but can also be at other rates depending upon the specific embodiment. Depending upon the embodiment, the system can be operated in an atomic force microscope (AFM) tapping mode and/or contact mode. Here, the probe is in direct contact with a portion of the sample according to a specific embodiment. Of course, there can be other variations, modifications, and alternatives.

Depending upon the application, the sample can include a substrate according to a specific embodiment. Additionally, the sample can be a plurality of substrates according to a specific embodiment. Depending upon the embodiment, the substrate can be made of a single layer or multiple layers. The substrate can be homogeneous and/or made of a variety of different materials according to a specific embodiment. The substrate can be a semiconductor (e.g., silicon, germanium Group III/V materials, semiconductor polymer material, Indium Tin Oxide, a conductor (e.g., metal, doped semiconductor, conductive plastic or polymer, ITO, or an insulator (e.g., glass, ceramic, polymer, plastic, dielectric material, mica), or any combination of these, depending upon the specific embodiment. In a preferred embodiment, the substrate is often a glass or quartz plate, which is suitable for biological reactions. The glass plate also has a suitable rigidity and substantially flat upper surface region, although there can be other variations, modifications and alternatives.

In a specific embodiment, the sample can be maintained in a desired environment. In a specific embodiment, the desired environment includes liquids, fluids (e.g., liquid and/or vapor), air, inert gas environments, or in vacuum and at specific temperatures (cryogenic, room temperature, warm to extremely high temperatures), depending upon the specific embodiment. Additionally, the environment can also be subjected to a determined relative humidity according to a specific embodiment. The relative humidity can range from about 22% to about 92% depending upon the specific embodiment. In a specific embodiment, the system also can maintain a substrate temperature ranging from about 23° C. to about 24° C. Of course, there can be other variations, modifications, and alternatives.

In a specific embodiment, the system also includes a tapping mode atomic force microscope ("AFM") 110. Depending upon the specific embodiment, the probe tip can be maintained at a contact force overlying a portion of the substrate at about 9 nano-Newton to about 25 nano Newton. Alternatively, the probe tip can be maintained at a contact force overlying the portion of the substrate greater than about 9 nano Newton, but can also be at other one or more forces according to a specific embodiment. In a specific embodiment, the AFM 110 has various elements such as probe 111, a cantilever to support the probe, which is coupled to a piezo-electric stack 105. Such piezo-stack provides for dithering and z-motion of the cantilever. The AFM also includes a driving signal, which is coupled to control electronics 107 for signal detection and correction. Preferably, probe has a pyramidal shape according to a specific embodiment. In the present embodiment, the tip includes the nanotube structure according to a specific embodiment. Specific details of the present probe can be found throughout the present specification and more particularly below.

Figure 2:
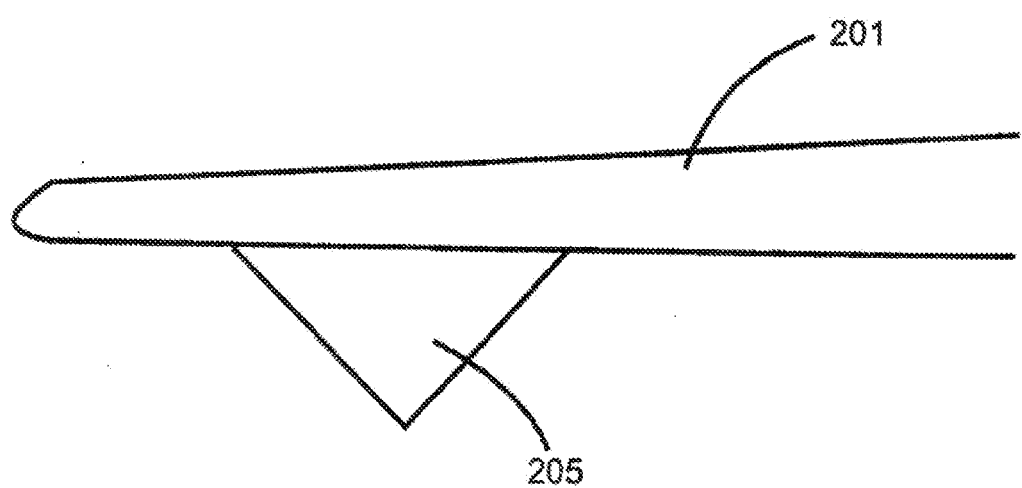
FIG. 2 is a simplified diagram of a probe tip for Dip-Pen nanolithography according to an embodiment of the present invention.

As shown, FIG. 2 is a simplified diagram of a probe tip for Dip-Pen nanolithography according to an embodiment of the present invention. This diagram is merely an example, which should not unduly limit the scope of the claims herein. One of ordinary skill in the art would recognize many variations, alternatives, and modifications. As shown, the AFM probe 201 is characterized by a tip structure 205. The tip structure is often made of silicon bearing species. The silicon bearing species is from a silicon wafer and/or other like material. The tip structure has a pyramid-like shape that protrudes from a base to an end, as shown. In a specific embodiment, the tip size ranges from about 20 to about 60 nanometers and is preferably less than about 30 nm. In a specific embodiment, the tip is coated with a silicon nitride bearing material, but can be others.

Depending upon the specific embodiment, the tip structure may include other characteristics. In a specific embodiment, the tip structure can include a nanotube base structure (e.g., single walled nanotube) coupled thereon. Additionally, the tip can be hydrophilic and/or hydrophobic according to a specific embodiment. In a specific embodiment, the tip can be from a dip pen probe with a hydrophobic material thereon. In a preferred embodiment, the present dip pen probe has a coating that is chemically inert, relative to a chemical and/or protein ink, and is a hydrophobic material, e.g., a polymer. In a specific embodiment, the hydrophobic material may be a Teflon-like polymer or Teflon™ material coating manufactured by E. I. du Pont de Nemours and Company. The coating may be <20 nanometers thick or <10 nanometers thick or <5 nanometers thick according to a specific embodiment. In a specific embodiment, the probe can be a general-use probe for many water-based protein inks.

In a specific embodiment, the present invention can be used with a probe(s) that may be a single walled nanotube or a silicon or silicon-nitride AFM probe that may or may not be coated with several materials. These probes may be conductive or coated to be conductive. Additionally these probes may be coated with materials (such as Teflon-like polymers) that electrically insulate the probe at all locations except at their very extremity. Additionally the probes may be shaped to achieve geometric electric field enhancement at the probe apex in a manner akin to the methodology of a lightning rod, see below. A method for applying an electric potential to this probe of any defined frequency or of constant voltage. The region of this electric potential will be sharply limited to a few nanometers (<100 nm or <20 nm or <5 nm) as a function of ionic and polar molecular content in the solution. Additionally, these probes may be coated with one or more functional molecules at their apex. Of course, there can be other variations, modifications, and alternatives.

Referring back to FIG. 1, the AFM also includes a laser source 113, which is directed to the cantilever or probe. The laser source is used as a position detector, which provides photons that scatter off of the cantilever and/or probe. Such scattered photons are detected by way of photodetector 117, which is coupled to control electronics 107. The control electronics provide feedback 119 to the stage according to a specific embodiment. The control electronics provide feedback 119 to the probe according to a specific embodiment. Feedback can also be provided to both the stage and cantilever according to a specific embodiment. Depending upon the embodiment, the AFM may be coupled to an inverted optical microscope (not shown) according to a specific embodiment. Additionally, the system also includes one or more sample reservoirs 123 according to a specific embodiment. In an optional embodiment, the reservoir includes at least a plurality of molecules to be dispensed and one or more surfactant species, which enhance transfer of the molecules onto a sample substrate. The reservoir is operably coupled to the probe tip, which is insertable within a portion of the fluid medium provided in the reservoir.

Depending upon the specific embodiment, the system is overseen and controlled by one or more computer systems, including a microprocessor and/controllers. In a preferred embodiment, the computer system or systems include a common bus, oversees and performs operation and processing of information. The system also has a display 121, which can be a computer display, coupled to the control system 380, which will be described in more detail below. Of course, there can be other modifications, alternatives, and variations. Further details of the present system are provided throughout the specification and more particularly below.

Figure 3:
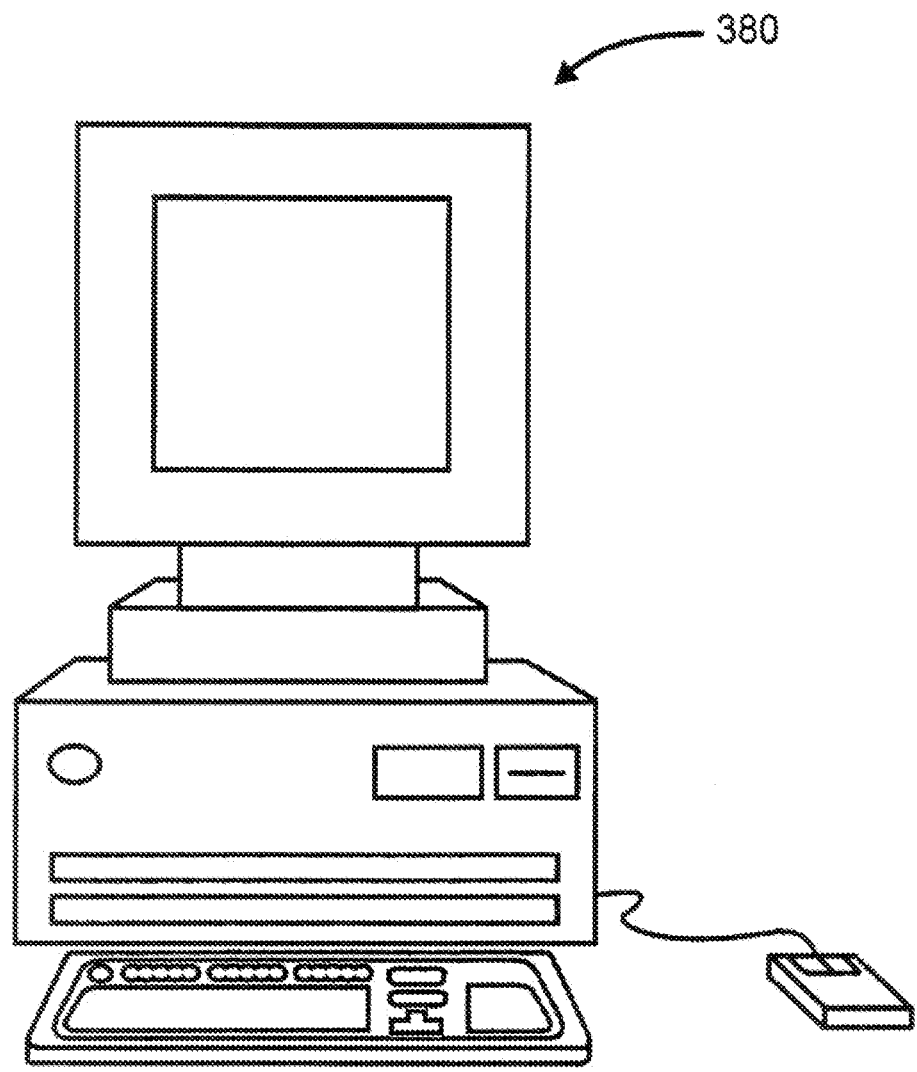
FIG. 3 is a simplified diagram of a computer system according to an embodiment of the present invention.

FIG. 3 is a simplified diagram of a computer system 300 that is used to oversee the system of FIG. 1 according to an embodiment of the present invention. This diagram is merely an example, which should not unduly limit the scope of the claims herein. One of ordinary skill in the art would recognize many other modifications, alternatives, and variations. As shown, the computer system includes display device, display screen, cabinet, keyboard, scanner and mouse. Mouse and keyboard are representative "user input devices." Mouse includes buttons for selection of buttons on a graphical user interface device. Other examples of user input devices are a touch screen, light pen, track ball, data glove, microphone, and so forth.

The system is merely representative of but one type of system for embodying the present invention. It will be readily apparent to one of ordinary skill in the art that many system types and configurations are suitable for use in conjunction with the present invention. In a preferred embodiment, computer system 300 includes a Pentium™ class based computer, running Windows™ NT operating system by Microsoft Corporation or Linux based systems from a variety of sources. However, the system is easily adapted to other operating systems and architectures by those of ordinary skill in the art without departing from the scope of the present invention. As noted, mouse can have one or more buttons such as buttons. Cabinet houses familiar computer components such as disk drives, a processor, storage device, etc. Storage devices include, but are not limited to, disk drives, magnetic tape, solid-state memory, flash memory, bubble memory, etc. Cabinet can include additional hardware such as input/output (I/O) interface cards for connecting computer system to external devices external storage, other computers or additional peripherals, which are further described below.

Figure 3A:
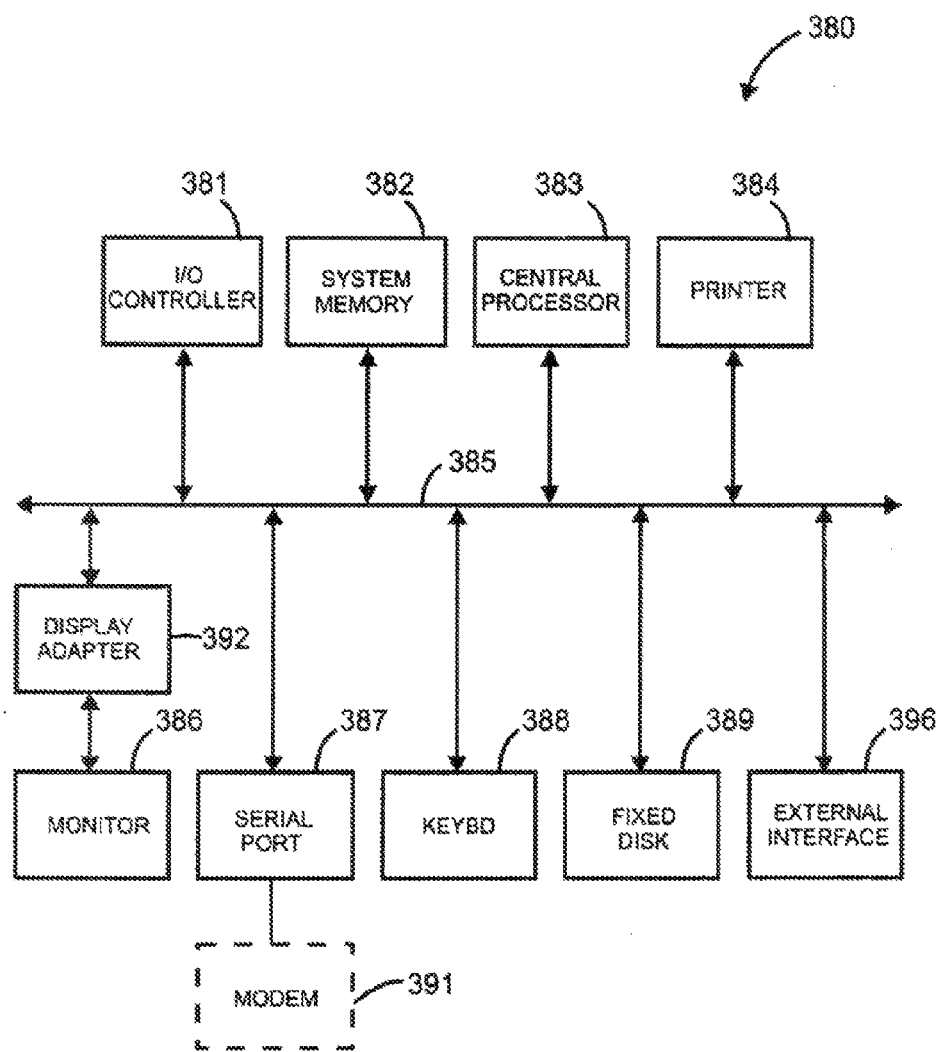
FIG. 3A is a simplified block diagram of a computer system according to an embodiment of the present invention.

FIG. 3A is a more detailed diagram of hardware elements in the computer system according to an embodiment of the present invention. This diagram is merely an example, which should not unduly limit the scope of the claims herein. One of ordinary skill in the art would recognize many other modifications, alternatives, and variations. As shown, basic subsystems are included in computer system 300. In specific embodiments, the subsystems are interconnected via a system bus 385. Additional subsystems such as a printer 384, keyboard 388, fixed disk 389, monitor 386, which is coupled to display adapter 392, and others are shown. Peripherals and input/output (I/O) devices, which couple to I/O controller 381, can be connected to the computer system by any number of means known in the art, such as serial port 387. For example, serial port 387 can be used to connect the computer system to a modem 391, which in turn connects to a wide area network such as the Internet, a mouse input device, or a scanner. The interconnection via system bus allows central processor 383 to communicate with each subsystem and to control the execution of instructions from system memory 382 or the fixed disk 389, as well as the exchange of information between subsystems. Other arrangements of subsystems and interconnections are readily achievable by those of ordinary skill in the art. System memory, and the fixed disk are examples of tangible media for storage of computer programs, other types of tangible media include floppy disks, removable hard disks, optical storage media such as CD-ROMS and bar codes, and semiconductor memories such as flash memory, read-only-memories (ROM), and battery backed memory.

Although the above has been illustrated in terms of specific hardware features, it would be recognized that many variations, alternatives, and modifications can exist. For example, any of the hardware features can be further combined, or even separated. The features can also be implemented, in part, through software or a combination of hardware and software. The hardware and software can be further integrated or less integrated depending upon the application. Further details of certain methods according to the present invention can be found throughout the present specification and more particularly below.

A method for forming one or more patterns using a Dip-Pen and surfactant according to an embodiment of the present invention may be outlined as follows:

1. Provide a substrate member, e.g., glass cover sheet;
2. Dip probe tip (e.g., atomic force microscope probe (AFM probe)) into ink solution, including an optional surfactant species;
3. Transfer ink solution onto probe tip to form a volume of fluid coupled to the probe tip;
4. Align the probe tip within a vicinity of a first spatial region of a surface region of the substrate member, which is characterized by a first characteristic, e.g., hydrophobic, hydrophilic, partially hydrophobic, partially hydrophilic;
5. Applies the probe tip within the vicinity of the first spatial region of the surface region of the substrate member;
6. Transfer one of more of a plurality of molecules characterized by a second characteristic through a fluid medium comprising the optional one or more surfactant species (e.g., detergent) overlying the spatial region via the probe tip provided within the vicinity of the spatial region of the surface region;
7. Move the probe tip from the vicinity of the first spatial region to a vicinity of a second spatial region on the surface region;
8. Continue to deposit one or more of the plurality of molecules characterized by the second characteristic through the fluid medium;
9: Repeat steps (2) through (8) for other ink solution (which may be the same, similar, or different) and other spatial regions, which can have the same size, different size, or similar size;
10. Form a micro-array (e.g., symmetrical, non-symmetrical) or other confirmation (e.g., circuit, sequential process, parallel process) of deposited molecules;
11. Perform other steps, as desired.

The above sequence of steps provides a method according to an embodiment of the present invention. As shown, the method uses a combination of steps including a way of forming a micro-array of deposited molecules according to a specific embodiment. Additionally, the method can also be used with an optional surfactant species to facilitate transfer of one or more molecules from an AFM probe tip or like probe tip onto a selected spatial region of a substrate member according to a specific embodiment. Further details of using the surfactant species can be found in U.S. Patent Application 20060242740 filed Aug. 10, 2005, and hereby incorporated by reference herein. Other alternatives can also be provided where steps are added, one or more steps are removed, or one or more steps are provided in a different sequence without departing from the scope of the claims herein. Additionally, the present method can be applied to other applications that are not for AFM techniques. Further details of the present method can be found throughout the present specification and more particularly below.

Figure 4:
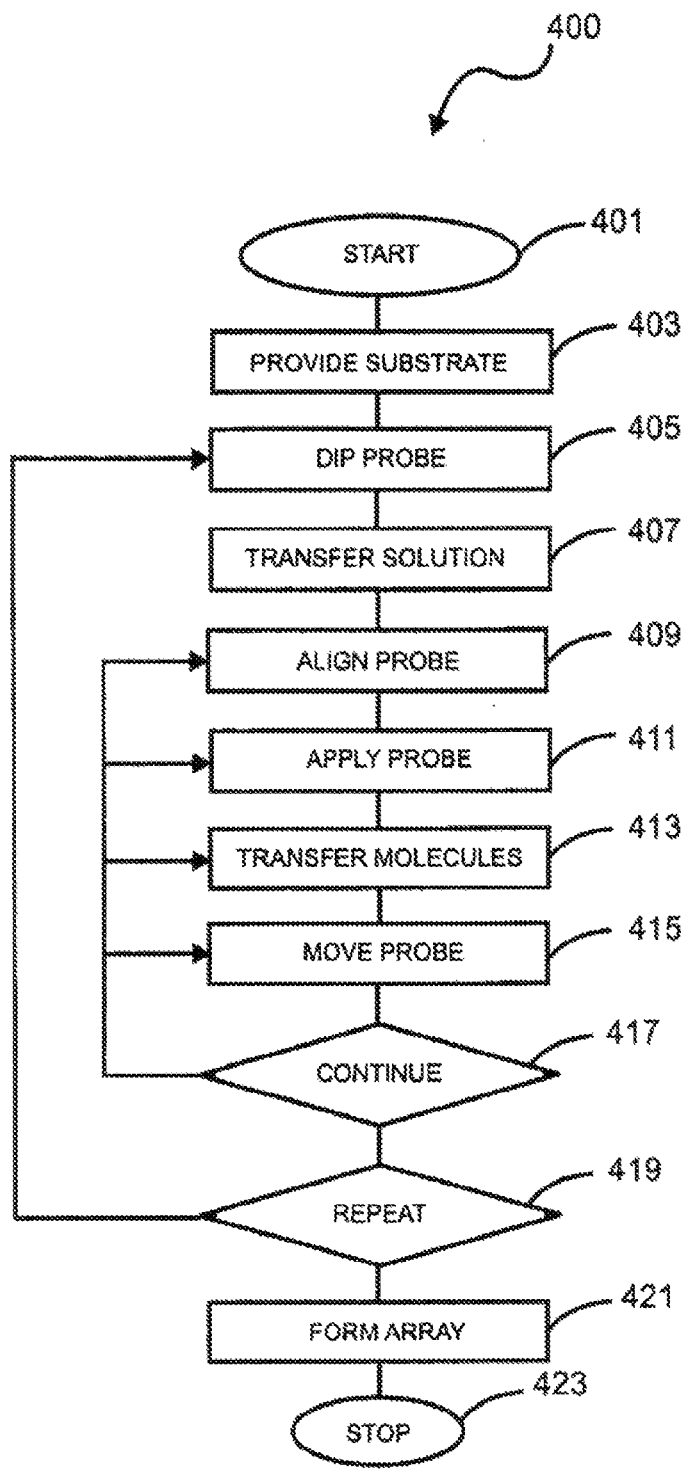
FIG. 4 is a simplified flow diagram illustrating a method for printing one or more patterns using a Dip-Pen according to an embodiment of the present invention.

FIG. 4 is a simplified flow diagram 400 illustrating a method for printing one or more patterns using a Dip-Pen according to an embodiment of the present invention. This diagram is merely an example, which should not unduly limit the scope of the claims herein. One of ordinary skill in the art would recognize many variations, alternatives, and modifications. As shown, the method begins with start, step 401. In a specific embodiment, the method provides (step 403) a substrate member, e.g., glass cover sheet. Depending upon the embodiment, the substrate can be made of a single layer or multiple layers. The substrate can be homogeneous and/or made of a variety of different materials according to a specific embodiment. The substrate can be a semiconductor (e.g., silicon, germanium Group III/V materials, semiconductor polymer material, a conductor (e.g., metal, doped semiconductor, conductive plastic or polymer, ITO), or an insulator (e.g., glass, ceramic, polymer, plastic, dielectric material, mica), or any combination of these, depending upon the specific embodiment. In a preferred embodiment, the substrate is often a glass or quartz plate, which is suitable for biological reactions. The glass plate also has a suitable rigidity and substantially flat upper surface region, although there can be other variations, modifications and alternatives.

In a specific embodiment, surfaces of the substrate are subjected to a cleaning and drying process. In a specific embodiment using a glass cover slip, the method uses a Piranha solution, which are often used to remove organic residues. As merely an example, the piranha solution is a 3:1 mixture of sulfuric acid and 30% hydrogen peroxide according to a specific embodiment, although it can vary depending upon the specific embodiment. The solution can be mixed before application or directly applied to the material, applying the sulfuric acid first, followed by the peroxide. (Note: Piranha solutions are energetic and may result in explosion or skin burns if not handled with extreme caution). Once cleaned, the substrate is subjected to a drying process according to a specific embodiment. The drying process often uses a bake and/or other techniques to substantially eliminate moisture from the substrate member according to a specific embodiment. Of course, there are other variations, modifications, and alternatives.

In a specific embodiment, the method transfers an ink solution, including a surfactant, for dispensing using a probe tip, which includes a tip structure. The tip structure is often made of silicon bearing species. The silicon bearing species is from a silicon wafer and/or other like material. The tip structure has a pyramid-like shape that protrudes from a base to an end, as shown. In a specific embodiment, the tip size ranges from about 20 to about 60 nanometers and is preferably less than about 30 nanometers. In a specific embodiment, the tip is coated with a silicon nitride bearing material, but can be others. Depending upon the specific embodiment, the tip structure may include a nanotube base structured coupled thereon. Of course, there can be other variations, modifications, and alternatives.

In a specific embodiment, the method dips (step 405) the tip into the ink solution, including an optional surfactant species. Depending upon the specific embodiment, the ink solution includes at least one or more molecular species to be transferred. The one or more molecular species can include biological materials, chemical materials, metal materials, polymer materials, solid state materials, small molecules (e.g., molecule structures of 100 atoms and less), dendrimers, DNA, proteins, semiconductors, insulators, organic thin films, inorganic thin films, any combination of these, and the like. Additionally, the method and applications can be from a variety of different fields such as electronics, semiconductor, inorganic chemistry, organic chemistry, life sciences, life style, security, petroleum, agricultural, biotechnology, financial, and others. Of course, there can be other variations, modifications, and alternatives.

Optionally, the ink solution includes a surfactant entity and/or species. In a specific embodiment, the surfactant is a detergent, which is capable of attracted to one or more portions of the one or molecules being disposed. In a specific embodiment, the detergent is also capable of being attracted to one or more portions of a surface region of the substrate. In a specific embodiment, the surfactant can be any suitable entity such as Tween 20. Further details of using the surfactant species can be found in U.S. Patent Application 20060242740, and hereby incorporated by reference herein. Of course, there can be other variations, modifications, and alternatives.

In a specific embodiment, the method transfers (step 407) the ink solution onto probe tip to form a volume of fluid coupled to the probe tip. Often times, the transfer occurs using cohesive forces within the fluid and between the probe tip and the fluid, which assists with the transfer of the fluid volume to the probe according to an embodiment of the present invention. Depending upon the specific embodiment, the transfer of the fluid is unaffected by the presence of the optional surfactant species. Of course, the surfactant may slightly retard or even enhance the transfer of the fluid volume according to a specific embodiment.

As shown in step 409, the method aligns the probe tip (e.g., atomic force microscope probe (AFM probe)) within a vicinity of a first spatial region of a surface region of the substrate member, which is characterized by a first characteristic, e.g., hydrophobic, hydrophilic, partially hydrophobic, partially hydrophilic. The method applies (step 411) the probe tip within the vicinity of the first spatial region of the surface region of the substrate member. Upon application, which occurs upon direct contact with the substrate or close proximity to the surface of the substrate, the method transfers (step 413) one of more of a plurality of molecules characterized by a second characteristic through a fluid medium comprising the one or more surfactant species (e.g., detergent) overlying the spatial region via the probe tip provided within the vicinity of the spatial region of the surface region.

Figure 5:
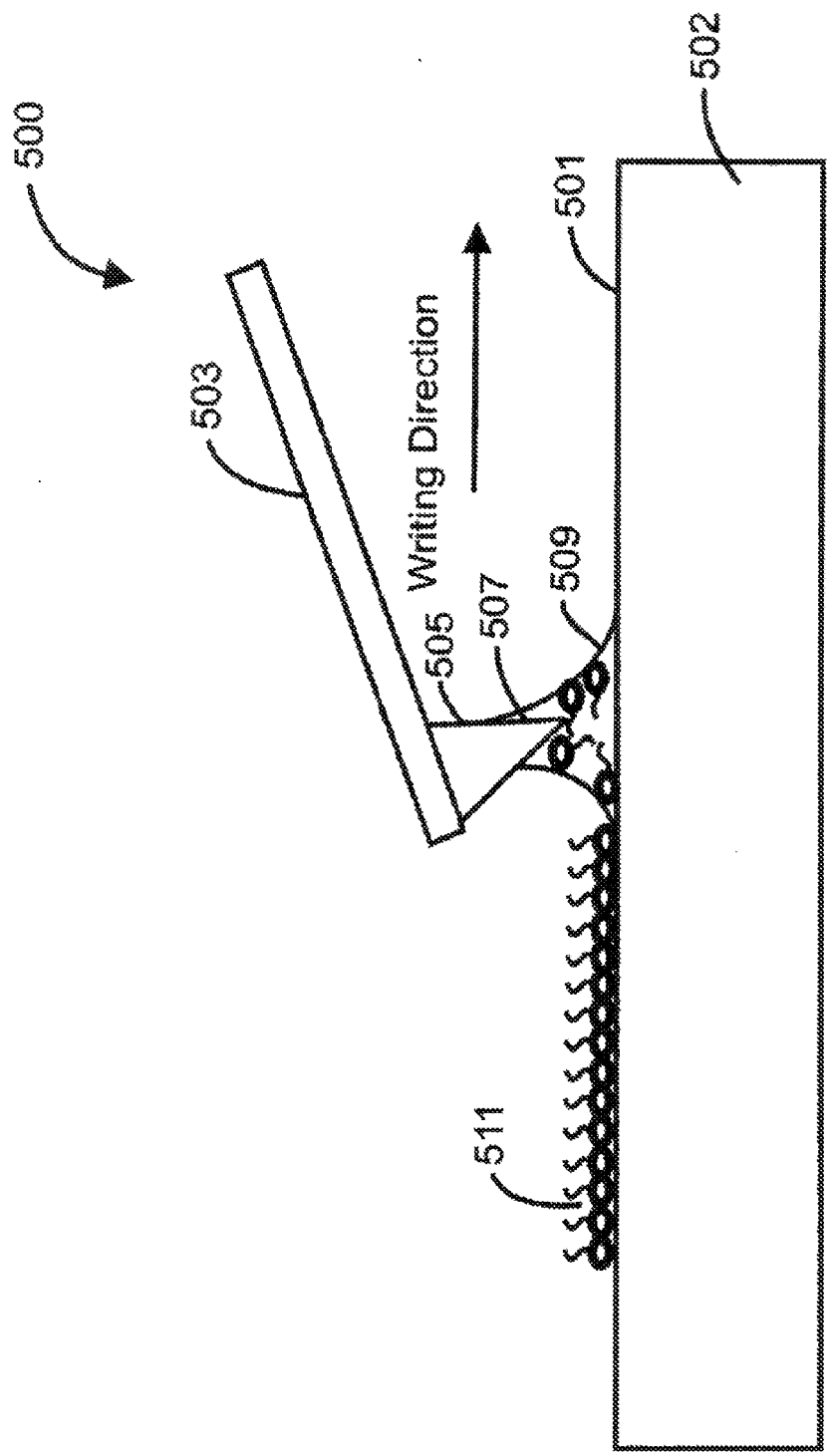
FIG. 5 is a simplified diagram illustrating a method for dispensing an ink medium using a Dip-Pen and surfactant according to an embodiment of the present invention.

Referring to FIG. 5, we have illustrated an example of a probe tip dispensing 400 one or more molecules in a pattern according to a specific embodiment. This diagram is merely an example, which should not unduly limit the scope of the claims herein. One of ordinary skill in the art would recognize many variations, alternatives, and modifications. As shown, the method provides a substrate member 502, which includes a surface region 501. The surface region may be subjected to one or more overlying mono-layers according to an embodiment of the present invention. As shown, the method forms a mono-layer of molecular species 511 according to a specific embodiment. Each of the molecules includes a first end attachable to a portion of the surface region and a second end, which is attachable to another molecule and/or species according to a specific embodiment. As shown, the probe 503, includes cantilever member coupled to a probe tip 505, which has an end 507 region. The end region is pointed toward the surface region in a specific embodiment. The end region may be normal or within an angle ranging from greater than about 0 Degrees to less than about 180 degrees from an imaginary line parallel to the surface region according to a specific embodiment. The probe, including a volume of fluid, is dispensed 509 overlying a spatial region of the surface region according to a specific embodiment. As the probe tip is moved from a first region to a second region (which is indicated by the "Writing Direction"), the molecules within the fluid continue to dispense across selected portions of the surface region according to a specific embodiment. Of course, there can be other variations, modifications, and alternatives.

Optionally, the volume of fluid includes the surfactant species, which facilitates transfer and attachment of the one or more molecules in the fluid volume. The surfactant has been mixed with into the volume of fluid and facilitates the transfer and application of the one or more molecules onto selected portions of the surface region. Of course, there can be other variations, modifications, and alternatives.

As further shown, the method includes moving (step 415) the probe tip from the vicinity of the first spatial region to a vicinity of a second spatial region on the surface region. Referring again to FIG. 5 and step 417, the method continues to deposit one or more of the plurality of molecules characterized by the second characteristic through the fluid medium comprising one or more surfactant molecules. In a specific embodiment, the movement of the probe is made at a suitable speed and rate, which may be consistent and/or vary with respect to time. The probe movement rate, also called scanning rate, can range from about 0.4 µm/sec to about 40 µm/sec according to a specific embodiment. The rate is preferably about 10 µm/sec and greater according to a specific embodiment. Of course, one of ordinary skill in the art would recognize other variations, modifications, and alternatives.

Depending upon the specific embodiment, the present method can also have other steps added, repeated, combined, and/or any combination of the above, and others outside of the present specification. In a preferred embodiment, the method repeats (step 419) the above steps for the same and/or other ink species and/or molecules according to a specific embodiment. In a specific embodiment, the present method continues to use the dispensing technique for form an array of active regions and/or spots on the substrate. Depending upon the embodiment, other steps can also be added, inserted, and/or performed (step 412) on the present substrate, including the mono-layer according to a specific embodiment. In a specific embodiment, the present method stops, at step 423. Of course, there can be other variations, modifications, and alternatives.

Figure 5A:
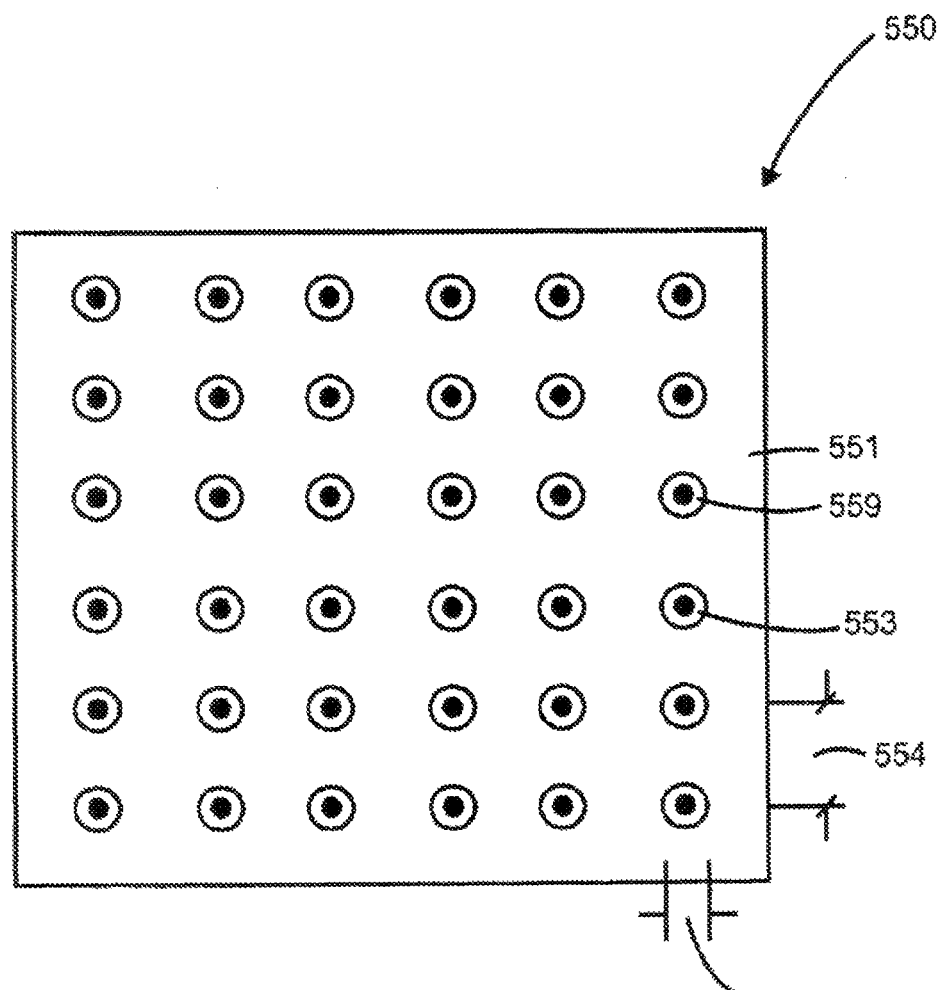
FIG. 5A is a simplified top-view diagram of an array device according to an embodiment of the present invention.

Referring to FIG. 5A, the method forms an array 550 of spots and/or active regions on the substrate 551 according to a specific embodiment. In a specific embodiment, the substrate can be homogeneous and/or layered and/or a composite. The substrate can be a glass, quartz, fused silica, gelled, silicon, plastic, ceramic, any combination of these, and the like, according to a specific embodiment. The substrate has a silane material overlying the surface region in a specific embodiment. Depending upon the embodiment, the silane material can be a blanket layer and/or patterned according to the embodiment. In a most general embodiment, the substrate has an overlying layer of material, which can be used as a starting point for building a plurality of active regions thereon. Of course, there can be other variations, modifications, and alternatives.

As shown, the substrate has a first active region 553 formed overlying a first portion of the silane material. In a specific embodiment, the first active region has one or more first biological molecules, chemical molecules, enzymes, proteins, semiconductor molecules, conductive molecules, any combination of these and/or other species of these entities, and the like. In a specific embodiment, the first active region has a first dimension of less than 1 micron in size 557 and has one or more first molecules capable of binding to the first portion of the silane material. Of course, there can be other variations, modifications, and alternatives.

In a specific embodiment, the substrate has a second active region 559 formed overlying a second portion of the silane material. In a specific embodiment, the first active region has one or more second biological molecules, chemical molecules, enzymes, proteins, semiconductor molecules, conductive molecules, any combination of these and/or other species of these entities, and the like. Here, the terms "first" and "second" are not intended to be limiting. In a preferred embodiment, the first and second active regions are different types of regions or may be similar or the same. The second active region has a second dimension of less than 1 micron in size and has one or more second molecules capable of binding to the second portion of the active region. In a specific embodiment, a spatial distance 554 is separating a first active region and a second active region. In a preferred embodiment, the spatial distance is characterized by a dimension of 1 micron and less. Depending upon the embodiment, various techniques can be used to form the active regions. In a preferred embodiment, the first active region is provided by a first dip pen process. In a preferred embodiment, the second active region is provided by a first dip pen process. Of course, there can be other variations, modifications, and alternatives.

In a specific embodiment, the active regions are spatially separated from each other by a determined dimension. In a specific embodiment, the active regions are spatially separated by 100 nm or less. In an alternative embodiment, the active regions are spatially separated by 30 nm or less. Depending upon the embodiment, one active region can be separated by almost any dimension to another active region using the dip pen process. That is, the dip pen process allows for any desired dimension between any two or more than two active regions according to a specific embodiment. Of course, there can be other variations, modifications, and alternatives.

Additionally, each of the active regions has a determined size and/or spot size according to a specific embodiment. In a specific embodiment, the active regions have dimension of less than 300 nm in size. In an alternative specific embodiment, the active regions have dimension of less than 100 nm in size. In yet an alternative embodiment, the active regions have dimension of less than 30 nm in size. Using the present dip pen process, the size of the active region can vary on the substrate according to a specific embodiment. That is, the size can be the same and/or similar among active regions or substantially different in size between two or more active regions according to a specific embodiment. Of course, there can be other variations, modifications, and alternatives.

In a specific embodiment, the first region and second region are provided in an array configuration. Here, the first region and the second region are two of a plurality of active regions in an array configuration according to a specific embodiment. Alternatively, the first region and the second region are two of a plurality of active regions in a circuit configuration, which may be in series and/or parallel, depending upon the specific embodiment. In a specific embodiment, where the second region or one or more active regions are in the array or circuit configuration, one or more of the active regions can be for detection and/or monitoring capability. In a specific embodiment, either direct readout (e.g., electrical, optical, physical) and/or production of a molecule that can be detected through a photon emission and/or electrical signal at yet another region can be included. In a specific embodiment, the present detection technique can detect a consequential and/or incidental product (e.g., waste) rather than a molecule species and/or molecule of interest to avoid damaging or slowing it. In a specific embodiment, a two component fluorophore can be used for monitoring and/or detection. Of course, there can be other variations, modifications, and alternatives. Further details of using the present substrate can be found throughout the present specification and more particularly below.

The above structure(s) and sequence of steps provide a method and structure according to embodiments of the present invention. As shown, the method uses a combination of steps including a way of forming a micro-array of deposited molecules according to a specific embodiment. Additionally, the method can also be used with an optional surfactant species to facilitate transfer of one or more molecules from an AFM probe tip or like probe tip onto a selected spatial region of a substrate member according to a specific embodiment. In a specific embodiment, the structure can provide a high density array with different types of active regions. Other alternatives can also be provided where steps are added, one or more steps are removed, or one or more steps are provided in a different sequence without departing from the scope of the claims herein. Additionally, the present method can be applied to other applications that are not for AFM techniques. Alternative methods according to the present invention can be found throughout the present specification and more particularly below.

A method for applying one or more specific maleimide entity molecules coupled to a cover glass according to an embodiment of the present invention may be outlined as follows:

1. Provide a glass cover slip;
  2. Clean cover slip with Piranha solution;
  3. Dry in bake oven for 25 to 30 minutes at a temperature of about 80 Degrees Celsius or greater;
  4. Form a mono-layer coating of silane (e.g., MPTMS) overlying a surface of the glass cover slip at a temperature of about 110 Degrees Celsius, where the silane group forms overlying the glass surface;
  5. Subject a tip having a silicon nitride material of a probe to a fluid including maleimide and surfactant entity to hold a fluid volume of the fluid on the tip of the probe;
  6. Apply tip of probe using an AFM tapping mode on a portion of the surface of the cover glass;
  7. Transfer one or more molecules from the fluid to the portion of the surface;
  8. Continue steps (5) through (7) to form a pattern on a selected portion of the surface of the cover glass to form an array of materials on the surface of the substrate;

9. Apply one or more other molecules on unpatterned region of the surface of the cover glass; and 10. Apply one or more bio-functional species onto the patterned; and 11. Perform other steps as desired.

The above sequence of steps provides a method according to an embodiment of the present invention. As shown, the method uses a combination of steps including a way of forming an array of materials using an AFM probe tip or like probe tip onto a selected spatial region of a substrate member according to a specific embodiment. In a specific embodiment, the present method can be used to form an array of molecules onto portions of the substrate member. Other alternatives can also be provided where steps are added, one or more steps are removed, or one or more steps are provided in a different sequence without departing from the scope of the claims herein. Additionally, the present method can be applied to other applications that are not for AFM techniques. Further details of the present method according to the present invention can be found throughout the present specification and more particularly below.

Figure 6:
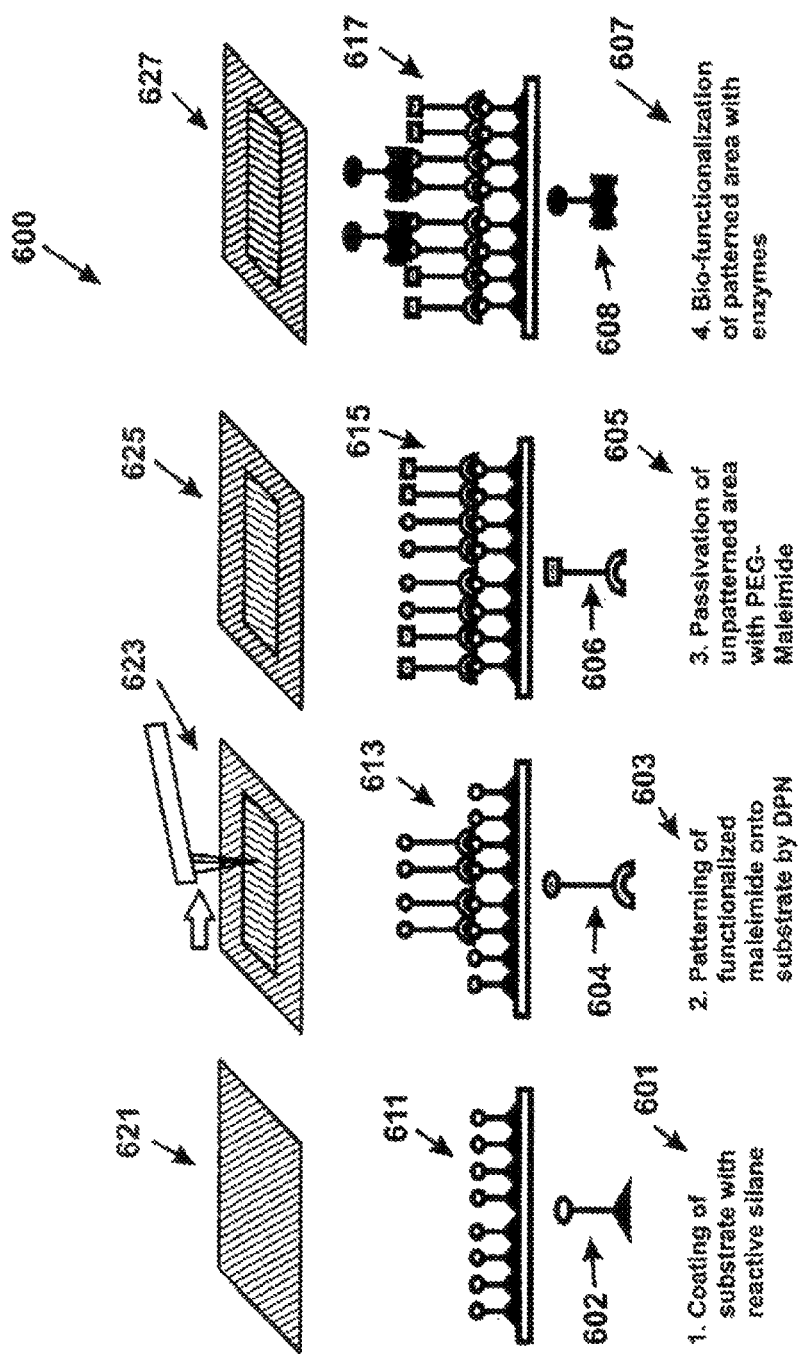
FIG. 6 is a simplified diagram illustrating a method for dispensing an ink medium using a Dip-Pen according to an alternative embodiment of the present invention.

FIG. 6 is a simplified diagram 600 illustrating a method for dispensing an ink medium using a Dip-Pen and surfactant according to an alternative embodiment of the present invention. This diagram is merely an example, which should not unduly limit the scope of the claims herein. One of ordinary skill in the art would recognize many variations, alternatives, and modifications. As shown, the method includes steps of coating a substrate with reactive silane molecules, which are illustrated by reference numerals 601, 611, and 621. Each of the reactive molecules 602 has a first end, which attaches to a portion of the substrate, and a second end, which will be attached to a functionalized maleimide, according to an embodiment of the present invention.

Referring again to FIG. 6, the method includes patterning (step 603) of functional maleimide onto a selected portion of the substrate. As shown, each functional maleimide 604 has a first end, which attaches to a reactive silane, and a second end according to a specific embodiment. The patterning is also illustrated using a side-view illustration 613 and a probe tip illustration 623 according to a specific embodiment. Of course, there can be other variations, modifications, and alternatives.

In a specific embodiment, which refers back to FIG. 6, the method includes passivating an unpatterned area with PEG-maleimide molecules, step 605. Each of the molecules 606 includes a first end, which attaches to a functionalized maleimide, and a second end, which is non-reactive, according to a specific embodiment. In a specific embodiment, the molecules can be applied (step 625) using a batch wet process, dry process, spray process, and/or any combination of these, and the like. That is, the PEG molecules selectively attach to the unpatterned area to form a resulting array structure 615 according to a specific embodiment. Of course, there can be other variations, modifications, and alternatives.

The method performs a bio-functionalization process (step 607 of the pattered regions with one or more enzymes according to a specific embodiment. Each of the enzymes 608 has a first end, which couples to the functionalized malemide, and second end, which may or may not be reactive, according to a specific embodiment. The enzymes can be applied (step 627) using a batch wet process, dry process, spray process, and/or any combination of these, and the like. That is, the enzymes selectively attach to the functionalized maleimide area to form a resulting array structure 617, which can be detectable and/or identified, according to a specific embodiment. Of course, there can be other variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

In yet an alternative specific embodiment, the present invention provides a method for forming an array of molecules using an acid writing technique, which is briefly outlined below.

1. Provide a glass cover slip;

2. Clean cover slip with Piranha solution;

3. Dry in bake oven for 25 to 30 minutes at a temperature of about 80 Degrees Celsius or greater;

4. Form a layer of linker molecules bearing dimethyloxytrityl (DMT) acid labile protecting groups;

5. Subject the layer of linker molecules to an aqueous solution;

6. Subject a conductive tip a probe to a selected portion of the linker molecule layer;

7. Apply an electrical potential relative to a reference point to the conductive tip of the probe;

8. Selectively remove one or more DMT protecting groups to expose respective one or more molecule regions;

9. Apply reactants to the one or more exposed molecule regions;

10. Repeat steps (6) through (9) for other linker molecule regions and other reactant species to form a pattern on the linker molecule layer; and 11. Perform other steps as desired.

The above sequence of steps provides a method according to an embodiment of the present invention. As shown, the method uses a combination of steps including a way of using an AFM probe tip, which has been biased using a voltage, to selectively remove certain protecting groups according to an embodiment of the present invention. In a specific embodiment, the present method can be used to form an array of molecules onto portions of the substrate member. Other alternatives can also be provided where steps are added, one or more steps are removed, or one or more steps are provided in a different sequence without departing from the scope of the claims herein. Additionally, the present method can be applied to other applications that are not for AFM techniques. Further details of the present method according to the present invention can be found throughout the present specification and more particularly below.

For assisting with the understanding of the present invention, we have determined that scanning probe nanolithography is not often compatible with solution-based chemistry necessary to synthesize template sites of high chemical diversity. This is because such synthetic schemes rely on multiple sequential steps in aqueous or organic solvents and would often require that the probe be fully immersed in solution while nanoscopic patterning is usually carried out in air. An electrochemical AFM-based nanolithographic technique is proposed here, which will permit the rational synthesis of specific monomer sequences of oligonucleotides, based on well-known combinatorial solid-phase DNA synthesis with nucleoside phosphoramidites. A conducting AFM probe tip serves as an amperometric electrode to generate extremely localized amounts of excess acid in buffered aqueous solution through the electrolysis of water. The diffusion field of the free acid will be limited to just a few nanometers beyond the physical surface of the probe by extremely rapid reactions of the electrogenerated protons with the conjugate base of a weak acid. This will result in a sharp pH gradient in the immediate vicinity of the tip. The local concentration of acid very near the probe surface will be high enough to selectively remove acid labile dimethoxytrityl (DMT) protecting groups from the 5' ends of oligonucleotides immobilized on a substrate and in close proximity to the probe. However, the pH of the bulk solution will be much higher, leaving the acid labile protecting groups on the functionalized substrate outside of the tip interaction region intact. Subsequent steps will add a specific monomer to the deprotected oligonucleotides only at the small regions defined by the probe tip. The modification of a surface functionalized with acid labile protecting groups can be performed with an acidic tip as it makes intermittent physical contact with the substrate in tapping mode. Of course, there can be other variations, modifications, and alternatives.

Depending upon the specific embodiment, the present method and system can have a variety of applications. As merely an example, this technique may be adapted to numerous examples of combinatorial synthetic methods using highly efficient acid or base deprotection chemistry followed by coupling reactions to fabricate peptide, oligomer, polymer, oligosaccharide, nucleic acid, and ribonucleic acids for extremely diverse and specific affinity tags patterned at the nanoscale. Nanoarrays can be fabricated in a combinatorial fashion to contain extremely high information content, defined by the number of unique sequences of monomers that can be synthesized at each site and the density of sites that can be patterned. Adaptation of combinatorial chemical methods for fabricating DNA, peptide, small-molecule, and protein micro-arrays to construct well-ordered and addressable architectures at nanoscopic length scales will add valuable insights to our understanding of the nature of the interactions between biomolecules and nanostructured materials. In a specific embodiment, the present method and system can also be applied to a field of molecular electronics. Further details of the present method and system can be found throughout the present specification and more particularly below.

We have also determined that scanning probe nanolithographic techniques have become extremely useful and versatile tools for the controlled fabrication of a range of organic, inorganic and biological structures at nanometer length scales. Nanolithography using an atomic force microscope (AFM) or scanning tunneling microscope (STM) enables precise chemical modification or highly-specific deposition of atoms or molecules on various surfaces. However, the possible implications for this technology go far beyond the capacity to fabricate unique nanostructures. The full power of nanolithography lies in enabling large-scale integration of a diverse set of molecular components into fully functional synthetic architectures that are addressable by the outside world [1]. Living systems offer compelling examples of such integration, an area of inquiry that is of fundamental importance in the biological and chemical sciences. The assembly of complex biological materials [2], as well as the emergence of dynamic higher-order functional capabilities from complex networks of interacting biomolecules at the cellular level is presently not well understood [3]. Bottom-up approaches to building simpler architectures include template-directed self-assembly of integrated biological and non-biological objects with nanoscopic precision will help our understanding of these processes [4]. In order to have the greatest utility, each site in the template should be designed to recognize a particular component (such as a protein, a sequence of DNA or an antibody) present in a complex mixture with extremely high specificity.

In a specific embodiment, an electrochemical AFM technique is included, which will permit the rational synthesis of specific monomer sequences at precise sites with nanometer accuracy and precision. In particular, we focus at an exploratory level on the synthesis of oligonucleotides, based on well-known combinatorial solid-phase DNA synthesis with phosphoramidites [5]. In a specific embodiment, a conducting AFM probe tip will serve as an amperometric electrode to generate extremely localized amounts of excess acid through the electrolysis of water at a sufficiently positive potential relative to a reference electrode also present in solution. The diffusion field of the free acid will be limited to just a few nanometers beyond the physical surface of the probe apex by extremely rapid reactions with the surrounding solution, buffered by a weak acid and its conjugate base. This will result in a sharp pH gradient in the vicinity of the tip. The local concentration of acid very near the probe surface will be high enough to selectively remove dimethoxytrityl (DMT) protecting groups from the 5' ends of oligonucleotides immobilized on a substrate and in close proximity to the probe. However, the pH of the bulk solution will be much higher, leaving the acid labile protecting groups on the functionalized substrate outside of the tip interaction region largely intact. Subsequent steps will add a specific monomer to the deprotected oligonucleotides only at a small region defined by the probe tip.

This electrochemical synthetic scheme has been successfully applied in the construction of fluorescent patterns on glass at 40 μm pitch, using DMT deprotection chemistry 161, and in the development of nucleic acid and polypeptide micro-arrays (100 μm diameter sites separated by 100 μm) [7]. The use of acid/base buffering reactions as a "chemical lens" in order to limit proton diffusion in scanning electrochemical microscopy (SECM) has been reported recently [8]. Applying the chemical lens technique with a conductive AFM probe will enable the tools of solid-phase electrochemical synthesis to be applied to nanolithography, a synergistic combination of methods which will enable the construction of biological and chemical arrays at previously inaccessible length scales.

We have also determined certain tradeoffs between high-resolution patterning and chemical diversity in conventional scanning probe lithographic techniques: conventional nanoscale scanning probe lithography is not compatible with the solution-based chemistry necessary to synthesize template sites of high chemical diversity. This is because such synthetic schemes rely on multiple sequential steps involving deprotection followed by coupling reactions. Conventional nanoscopic patterning is usually carried out in air, while the conditions necessary for performing combinatorial solid-phase syntheses, like those proposed here, often require that the probe be fully immersed in aqueous or organic solvents according to an embodiment of the present invention.

As additional background information, we determined that scanning probe nanolithography describes a broad class of methods that employ a sharp scanning probe to specifically alter the chemical or material property of a surface. Dip-pen nanolithography (DPN) [9] uses an "inked" AFM tip to directly deposit molecules onto a substrate, and has been used to create nanoscopic patterns of many different materials including solid-state materials [10], DNA [11], proteins [12] and viruses [13]. Other scanning probe methods involve applying a potential difference between the tip and a substrate to initiate an electrochemical process, such as conducting-probe AFM [14-17] and scanning electrochemical microscopy (SECM) [18]. Scanning probes have also been used to mechanically alter a surface, such as AFM-induced nanografting or nanoshaving of self-assembled monolayers [19, 20]. Biological macromolecules including proteins have been immobilized in this way. This latter approach is attractive because it can be performed under physiologically relevant conditions in solution. Numerous variants and hybrids of these techniques have also been reported.

Lithographically defined surface templates guide the assembly of molecular building blocks through carefully designed chemical or physical interactions. The limiting spatial resolution in the construction of these templates by scanning probe techniques is ultimately defined by the effective interaction region of the scanning probe tip with the substrate. The highest resolutions are obtained when this interaction region approaches the physical dimensions of the sharp tip itself. In the majority of scanning probe lithographic techniques, tip-defined high resolution writing is only possible when the patterning is carried out in air with careful control of the relative humidity. In these cases, the spontaneous condensation of a nanometer-thick atmospheric water layer between the probe tip and the substrate may facilitate local molecular transfer from the tip [21], or can define a nanoscale electrochemical cell for patterning by reduction-oxidation (redox) reactions when a potential difference is applied between the tip and the surface. This has been demonstrated with conducting-probe AFM [14-17] and direct mode scanning electrochemical microscopy (SECM) using an STM tip as the electrode [22]. Here, only the very end of the tip is in contact with the liquid layer.

Although numerous specific chemical or physical modifications have been initiated by scanning probes on a wide variety of substrates, a common limitation is that currently only a single modification at a surface is possible with the same probe. A coated AFM tip used for DPN can generate multiple different patterns, but all sites will present the same chemical functionality after each writing step unless the tip is replaced with one "inked" with a different molecule. Nanografting or nanoshaving removes or alters surface bound material through the action of the scanning probe but is similarly impractical for multiple sequential modifications at a given site. Electrochemical patterning under ambient conditions in air may offer greater flexibility if a mixture of species coated on the tip or dissolved in the ultra-thin hydrated layer can be selectively deposited onto a substrate at different applied potentials, or if different regions of the substrate can be differentially etched, oxidized or reduced. However, this has not been demonstrated in a general manner. The necessity of an ultra-thin hydrated layer in order to obtain high-resolution patterns makes rapid changes of solution composition for sequential modifications of patterned areas (needed for synthesis of an oligonucleotide or polypeptide) impractical.

The "chemical lens" increases resolution in solution-phase SECM: The deprotection of acid labile groups in DNA synthesis is a reaction that must be carried out in solution. SECM combines scanning probe microscopy and lithography with the versatility and generality of an ultra-micro-electrode (UME) for probing electrochemical and chemical reactions. The SECM is thus an ideal tool for driving a wide variety of processes in solution including oxidation-reduction, acid-base and precipitation reactions for patterning surfaces [23]. SECM operation in solution requires the use of a chemical lens in order to limit molecular diffusion and achieve or even surpass tip-limited resolution. In addition to the example given above of a chemical lens employing an acid/base buffer [8] numerous other buffers and scavengers have been reported that improve resolution when using SECM for patterning metals [24, 25], semiconductors [26], conductive polymers [27] and enzymes [28] on both conducting and non-conducting substrates. Resolution as high as one third of the tip diameter have been reported. However, it is important to note that the UMEs used in these studies were several micrometers in diameter.

The majority of studies employing chemical lens systems have been carried out in feedback mode, which is the most frequently used mode of operation for SECM. In the feedback mode, the tip is held close to the substrate in solution containing one form of a redox pair that functions as an electroactive mediator. The mediator serves both as a means for controlling tip position relative to the substrate by ionic current measured by the UME, and as a way to drive specific electrochemical reactions to pattern the substrate. The tip current is perturbed by the presence of the substrate by blockage of diffusion of the mediator to the tip (negative feedback) or by regeneration of mediator at the substrate (positive feedback). In the other mode of SECM, the direct mode, the tip generates a reactant that can then be detected at a substrate electrode (or viceversa). STM imaging and nanopatterning on mica in humid air is an example of direct mode SECM [22]. It has been suggested that an electrochemical mechanism could be responsible for STM-based nanolithography in air [29] although the majority of reports on STM nanofabrication do not distinguish between tunneling and faradaic processes.

The use of feedback mode SECM in solution with a chemical lens is promising for synthesizing specific DNA oligomers at precise locations. However, the resolution in feedback mode is limited by the size and shape of nanoelectrodes that can be produced. Micron-sized UME disk electrodes can be routinely fabricated whereas nanoscale UMEs are much harder to produce reliably, although considerable progress has been made [30]. For operation in liquids, the electrode must be encased in an insulator except for the very end of the tip. The shape of the UME is important: UMEs with near perfect disk shapes inlaid in an insulating sheath give the best sensitivity. These requirements are more difficult to meet for nanometer UMEs. Below a radius of about 2 μm, a perfect microdisk UME is unlikely to be made [31]. The true geometry of the nanoelectrode should be carefully characterized by scanning electron microscopy (SEM), voltammetry, or related techniques. Even assuming that nanometer UMEs can be reliably and reproducibly manufactured, additional difficulties arise when employing them in feedback SECM [32]. Although decreasing the tip size improves resolution, it can have opposite effects on the signal-to-noise ratio (SNR) and scanning speed. Faradaic currents for disk shaped UMEs are linearly proportional to tip size. A decrease in tip radius from 5 μm, a reasonable value for an UME, to 10 nm for an AFM tip, represents a factor of 500 drop in current, which will probably be measurable in the low pA to fA range. Such small currents can be detected by contemporary instrumentation, but a proportionate increase in the low-pass filtering frequency (which leads to increased distortion of data) or a slower scan speed will be needed in order to maintain the same SNR. These considerations also affect the sensitivity, time response and dynamic range of the electronic feedback loop controlling the scanning of the probe.

Adapting the "chemical lens" for scanning probe nanolithography: There has been much recent interest in coupling SECM with other scanning probe techniques, such as AFM [33] and near field scanning optical microscopy (NSOM) [34]. Complementary information acquired simultaneously and at the same location will expand the capabilities of SECM: In the specific case of the work proposed here, the role of the nanoscopic scanning probe in generating the electroactive species of interest is actually divorced from that of detection of weak steady-state currents for position control.

The positioning of the probe should instead be controlled through detection of force, that is, by using an AFM. There is no a priori reason why the probe position must be controlled through detection of current when the only goal is to electrochemically modify a surface. This is why AFM-based techniques have become so popular recently in electrochemical nanofabrication. The chemical lens concept is general and does not necessarily rely on regeneration of redox mediators employed in feedback controlled SECM. What it does require is ultra fast quenching of the electroactive species generated in solution by the probe tip before molecular diffusion in solution can broaden their spatial extension. The modification of a surface functionalized with acid labile protecting groups can be performed with an acidic tip as it makes intermittent physical contact in tapping mode. Tapping mode AFM has been proven to be gentle enough not to damage oligonucleotides tethered to surfaces [35].

In a specific embodiment, the present method and system can be applied to a broad class of solid phase polymeric synthetic routes for producing DNA, RNA, polypeptide, and many other chemical sequences, which can be adapted to nanoscale electrochemical patterning techniques. As merely an example, we note that the AFM is a versatile tool for such a feasibility study since most of the operating conditions and experimental parameters can be explored quickly and rapidly. Examples include changes in scanning parameters, electrode potentials, and tip geometry and composition. AFM is particularly useful in this regard since the patterned areas can be imaged immediately, allowing for rapid feedback and process optimization. In a specific embodiment, the present method and system can be scaled-up for the fabrication of vast numbers of nanoscale array elements, electrochemically patterned either by parallel multiple-probe "nanoplotter" devices [36], or by individually addressable fixed nanoscopic electrodes [37], which could be placed in proximity to the patterned substrate. Of course, there can be other variations, modifications, and alternatives.

Figure 7:
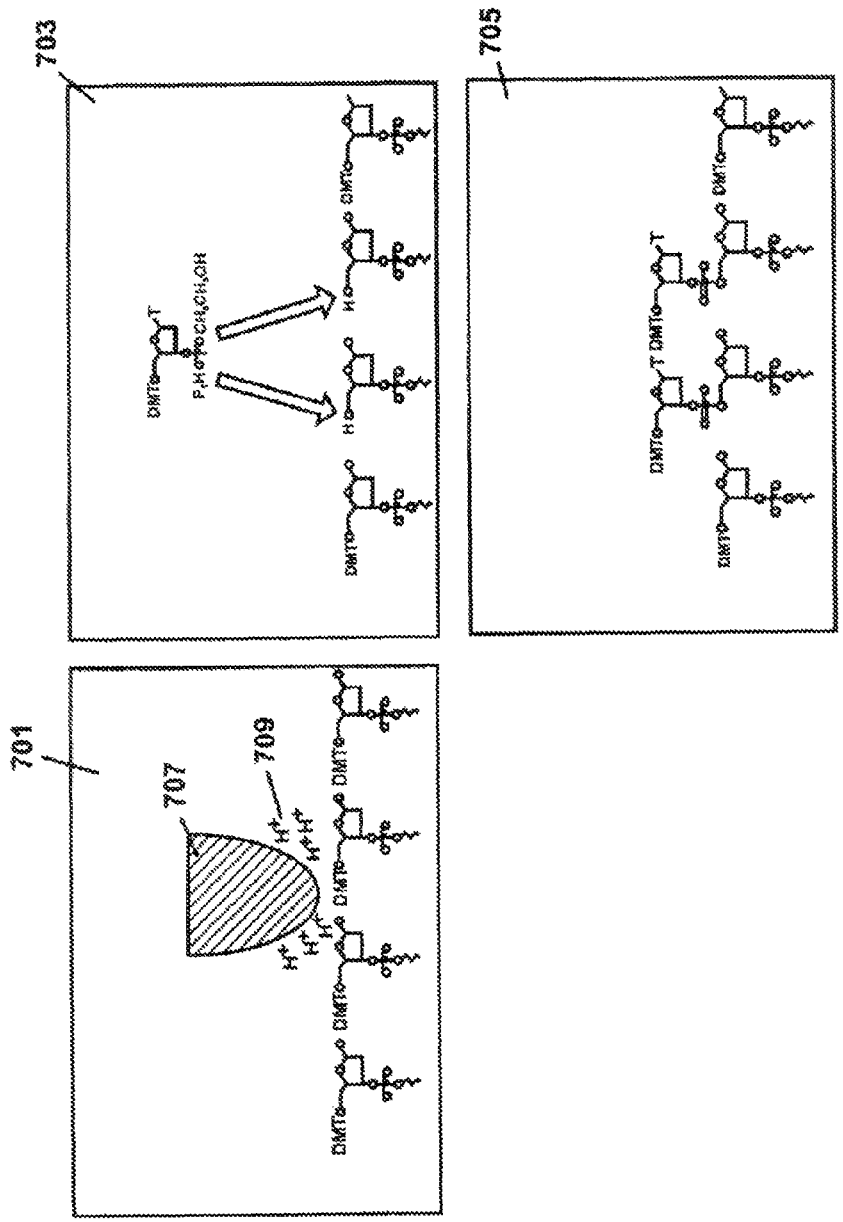
FIG. 7 is a simplified diagram illustrating an acid writing process using an AFM probe according to an embodiment of the present invention.

FIG. 7 is a schematic representation of the chemical steps 701, 703, 705 provided to carry out for the synthesis of specific sequences of oligonucleotides at patterned sites according to an embodiment of the present invention. This representation is merely an example, which should not unduly limit the scope of the claims herein. One of ordinary skill in the art would recognize other variations, modifications, and alternatives. The location of each site will be determined by a conductive AFM probe tip 707 electrochemically generating acid 709 in close proximity to a surface functionalized with a first layer of phosphoramidite monomers bearing dimethoxytrityl (DMT) acid labile protecting groups. In a specific embodiment, the substrate is functionalized everywhere with a precursor monolayer of DMT-protected cytosine phosphoramidites (C) by a linker attached to the surface. The linker should be terminated with pendant hydroxyl groups that will react with phosphoramidites, but the head group can be designed to bind to a variety of insulating or conducting surfaces, for example, through thiol-binding to gold surfaces or silane-binding to glass.

In a specific embodiment, the chemical synthetic steps for forming oligonucleotides will be the same as used by commercial DNA synthesizers except that the DMT deprotection step in a synthesizer is carried out with trichloroacetic acid in anhydrous acetonitrile. Here, the substrate is exposed to an aqueous solution containing approximately 0.1 M $H_2PO4/HPO_4^{2-}$ buffer. A positive potential is applied to a suitably modified conductive AFM tip at specific locations, which removes the DMT protecting groups from the cytosine phosphoramidites (C). The substrate is washed with acetic anhydride and then exposed to a solution of thymidine phosphoramidite (T) and tetrazole in anhydrous acetonitrile. The T nucleotides react with the C nucleotides to form C-T dimers only at the patterned sites. Any remaining unreacted C nucleotides are capped by exposing the substrate to acetic anhydride and 1-methylimidazole in anhydrous acetonitrile. The internucleotide linkages in the C-T dimers are converted from the phosphite to the more stable phosphotriester using iodine as the oxidant and water as the oxygen donor. This procedure can be repeated multiple times at selected sites with any combination of adenosine (A), guanosine (G), C, and I phosphoramidites to synthesize a diverse array of oligonucleotide sequences in a combinatorial manner. Removal of base labile protecting groups from the exocyclic amines on the A, G and C nucleotides and of the cyanoethyl protective groups from the phosphotriester internucleotide linkages by aqueous ammonium hydroxide at 50° C. leaves single strands of active oligonucleotides bound covalently to the substrate. These series of chemical steps, carried out with different reagents for each step as well as the inclusion of several intermediate rinse steps will necessitate careful design of an electrochemical AFM fluid cell that is compatible with fluid-flow and temperature control. Although the above has been shown in terms of acid based chemistry, other chemistries including bases (e.g., hydroxide) can be used. Of course, there can be other variations, modifications, and alternatives.

In a specific embodiment, the present method and system can be applied to development of other applications. This technique may be adapted to numerous examples of combinatorial synthetic methods using highly efficient acid or base deprotection chemistry to fabricate peptide, oligomer, polymer, oligosaccharide, nucleic acid, and ribonucleic acids for extremely diverse and specific affinity tags patterned at the nanoscale. Nanoarrays can be fabricated in a combinatorial fashion to contain extremely high information content, defined by the number of unique sequences of monomers that can be synthesized at each site and the density of sites that can be patterned (feature size, pitch).

Combinatorial chemical methods for fabricating DNA, peptide, small-molecule, and protein micro-arrays show promise in becoming powerful tools for probing gene expression, identifying new binding interactions between specific ligands and receptors, and discovering new components of signaling pathways [38-40]. Extension of this chemistry to the nanoscale will allow for reduced feature size and more densely packed features. More importantly, the nanoscale is the relevant length scale for probing the processes of molecular recognition and intermolecular dynamics between proteins and other biological macromolecules. It is also the relevant length scale for understanding and exploiting the interactions between biomolecules and nanostructured materials such as carbon nanotubes and semiconducting or metallic nanoparticles and nanowires. It will thus be useful for the assembly of hybrid biological and nanoscale materials and the development of molecular electronics.

In a specific embodiment, the present method and system can be used for applications to AFM nanolithography in solution: In a specific embodiment, a core concept is that electrochemically generated reagents diffuse outward from the surface of a conductive AFM tip while buffering or scavenging species diffuse inward toward the tip. If the chemical reaction between them is fast enough, the reaction zone is spatially constrained to a very thin layer about the tip, where both species encounter one another. Inside of this zone, the concentration of the tip-generated species is much higher than the buffering species, and the opposite is true outside of this zone.

If the tip-generated species is an acid, then a very steep steady-state pH gradient will be rapidly generated at the tip.

A way to electrochemically generate H$^+$ at the tip is through electrolysis of water (which we have outlined below as an example):

$$H_2O \rightarrow 2H^+ + \tfrac{1}{2}O_2 + 2e^- \quad [E^0=1.67V \text{ vs. NHE}] \tag{1}$$

where $E^0$ is the standard reduction potential versus a normal hydrogen electrode (NHE).

Buffers could include any electrolyte salt used in aqueous or semi-aqueous reactions, but for the specific example presented here, the phosphate buffer system consisting of the singly-dissociated $H_2PO_4^-$ anion as the weak acid and its conjugate base will be considered. The $pK_a$ of this butler is 7.3:

$$H_2PO^{4-} \underset{k_b}{\overset{k_f}{\rightleftharpoons}} H^+ + HPO_4^{2-} \tag{2}$$

$$K_a = \frac{[H^+][HPO_4^{2-}]}{[H_2PO_4^-]} = \frac{k_f}{k_b} = 5 \times 10^{-8} \text{ M}$$

Including equal amounts (0.1M) of $H_2PO4$ and $HPO_4^{2-}$ buffers the pH of the solution at 7.3. The heterogeneous surface reaction driven by the production of H$^+$ is the detritylation of the nucleotide base:

$$H^+ + DMTO\text{---}B \rightarrow HO\text{---}B + DMT^+ \tag{3}$$

The homogeneous buffering reaction (2) is extremely rapid. The transfer kinetics between a proton and the anion of many weak acids are diffusion limited, and are one of the fastest classes of bimolecular reactions known. Typical values for the backward rate constant in equation (2) representing the reprotonation of the anion are on the order of $10^{10}$ to $10^{11}$ M$^{-1}$ s$^{-1}$. These are typical values for the anions of acids in which the acidic proton is located on oxygen or nitrogen [41].

Although the local concentration of H$^+$ needs to be high for the detritylation reaction at the surface, the absolute flux of protons injected into bulk solution by the tip will be quite low (the faradaic currents needed for surface modification will likely be in the pA range). The concentration of the conjugate base in the phosphate buffer system outside the reaction zone will therefore remain many orders of magnitude higher than that of electrochemically generated changes in the concentration of H$^+$ near the tip. It can then be assumed that the concentration of $HPO_4^{2-}$ will be nearly constant during the process and the homogeneous reaction (2) is pseudo-first order with rate constant $k_b$. If the initial concentrations of $H_2PO4$ and $HPO_4^{2-}$ were each 0.1 M, then $k_b$ would equal about $10^9$ s$^{-1}$. In addition, inspection of the equilibrium expression in equation (2) shows that $k_f$, the forward rate constant for dissociation of $H_2PO_4^{2-}$, is many orders magnitude smaller than the reverse rate. An additional approximation can then be made to neglect the dissociation of $H_2PO_4^{2-}$ in determining the concentration profile of H$^+$ near the tip. With these two approximations, the one-dimensional concentration profile of the confined electrochemically generated acid can be estimated from:

$$\frac{\partial C_H(x,t)}{\partial t} = D_H \frac{\partial^2 C_H(x,t)}{\partial x^2} - k_b C_H(x,t) \tag{4}$$

where $C_H$ is the concentration of H$^+$ and $D_H$ is the diffusion coefficient of H$^+$. This estimate of the concentration profile will be close to correct only near the tip. At steady state (t>4/kb), the concentration profile of the acid is independent of time:

$$\frac{\partial C_H(x,t)}{\partial t} = 0 \tag{5}$$

and equation (4) can be simplified to:

$$\frac{d^2 C_H(x)}{dx^2} = \left(\frac{k_b}{D_H}\right) C_H(x) \tag{6}$$

with boundary conditions $$C_H(x = \infty) = C_H^0 \tag{7}$$

$$\left[\frac{dC_H(x)}{dx}\right]_{x \to 0} = \frac{i}{nFAD_H}$$

Here, i is the current, F is the Faraday constant, n is the number of electrons (two) transferred during the generation of H$^+$, and A is the active tip radius. $C^0_H$ is the bulk concentration of H$^+$ (solution pH), defined by the initial composition of the buffer components before the voltage is applied to the tip. The second boundary condition in (7) gives the steady state concentration of H$^+$ in the immediate vicinity of the nanoelectrode, well within the reaction zone. The concentration of the acid as a function of distance from the electrode can be found by solving equation (6):

$$C_H(x) = \frac{i}{nFAD_H} \mu \exp\left(-\frac{x}{\mu}\right) \tag{8}$$

$$\mu = \left(\frac{D_H}{K_b}\right)^{\frac{1}{2}}$$

$\mu$ is a measure of the thickness of the reaction zone and has units of length. Based on the values for the diffusion coefficient of in aqueous solution (9.3×10$^{-9}$ m$^2$ s$^{-1}$) and $k_b$'(10$^9$ s$^{-1}$), this length is on the order of 3 nm. The derivation of $\mu$ is adapted from the work of Tian and coworkers, which they call the "confined etchant layer technique" (CELT) [42]. In CELT, a scavenger (arsenic acid) was used to limit the diffusion of electrochemically generated bromine in the etching of silicon with an SECM [26].

Figure 8:
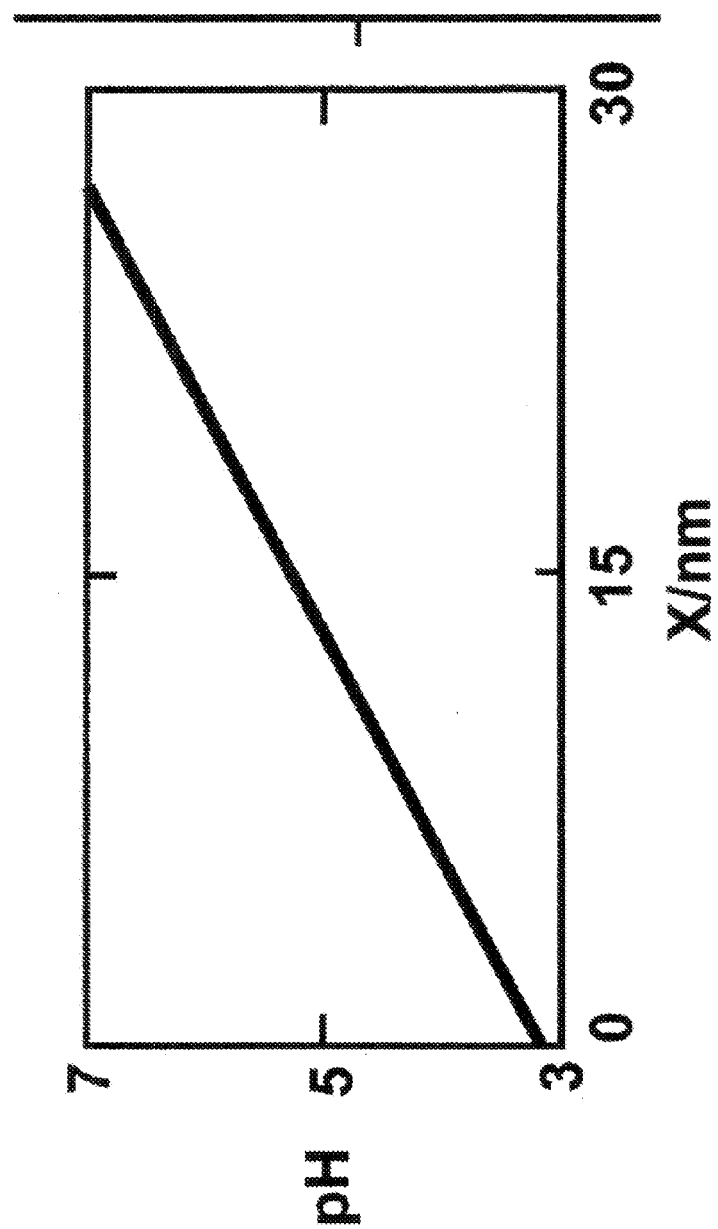
FIG. 8 is a simplified plot of pH against distance according to an embodiment of the present invention.

As merely an example, in the technique reported by Southern and coworkers [6], the total surface coverage of DMT groups attached to a 1×1 cm$^2$ glass surface was determined to be 10 pmoles/mm$^2$. 100-fold excess of electrochemically generated protons from an indium microelectrode array separated vertically from the glass surface by a gap of 20 µm resulted in complete removal of the DMT groups under the anodes within a few seconds. In this volume, a surface coverage of 1000 pmoles/mm$^2$ corresponds to a solution concentration of 0.5 mM H$^+$ (assuming all the protons generated by the anodes crossed the gap and reacted with the DMT-functionalized surface). Although a different electrochemical system was used to generate H$^+$, and anhydrous acetonitrile was used as the solvent, this result suggests that 0.5 mM (pH=3.3)

is a reasonable lower limit for the local acid concentration needed to pattern a DMT-functionalized surface with a conducting AFM tip. FIG. 8 is a simplified plot of equation (8) (generated using Mathcad, as an example) which displays the change in pH with distance from the nanoelectrode. The current, i, was set to 10 pA, and the radius of the electrode was 7.5 nm, a typical value for an AFM tip. The pH at steady state conditions has increased from 3.1 at the electrode to 7.0 within a distance of just 27 nm.

There are notable differences in the "chemical lens" technique as it applies to fabricating structures with SECM and its implementation using AFM proposed here. In SECM, the chemical lens actually produces the highest resolution patterns beyond a critical tip-sample separation distance. This is because at larger distances, more scavenger molecules can diffuse between the tip and sample and react with the electrochemically generated species. Linewidths as small as ⅓ the tip size have been reported (10 μm for a 35 μm diameter UME) [24]. For tapping mode AFM, the surface modification is most likely to occur during physical contact of the tip with the surface. In this case, the resolution will be defined by the size of the active area, which is on the scale of nanometers.

In a specific embodiment, the amount of acid that will need to be generated by a conductive AFM probe for nanoscale patterning will be extremely small (1000 pmoles/mm$^2$), certainly much smaller than would be needed for the bulk electrolysis of water. The tiny amount of acid generated at the tip will not exhaust the capacity of the buffer and there will be no noticeable change in solution pH. Of course, there can be other variations, modifications, and alternatives.

In a specific embodiment, the present invention includes a method and structure for a probe including a tip region. For SECM, not only the tip size, but also the tip shape has an impact on obtaining quantitative measurements. This constraint is relaxed with AFM since the scanning of the tip is not controlled via currents. AFM tips coated with a metal, such as platinum or gold, which are commercially available, would be convenient probes for evaluating the present method and system. In addition, high resolution scanning probes based on multiwall carbon nanotubes (MWNTs) [43-45], single wall carbon nanotubes (SWNTs) [46-48] and bundles of SWNTs [49] are being developed. Aspects of AFM tips that should be considered in deciding which type of probe to use include the physicochemical heterogeneity of the electrode surface-solution interface, which affects the electron transfer efficiency, and the means available for insulating the entire probe surface except for the last few nm of the tip. Conventional metal-coated AFM tips can be insulated with varnish, polymers or electrophoretic paint, although each technique has its drawbacks. However, because the reaction zone distance, μ, is so small (3 nm for the conditions described above), it may not even be necessary to insulate the tip, since only the very end of the probe in direct physical contact with the substrate would efficiently modify the surface. The time scale for achieving the steady state generation of the nanoscopic pH gradient about the tip (ns) will be orders of magnitude faster than the round-trip travel time of the oscillating cantilever in tapping mode (tens of μs). The consequence of this is effectively an "acidic" probe, the size of which is twice the sum of the true tip radius plus the distance necessary to raise the pH to the point where the DMT groups are no longer efficiently removed. For most commercially available probes this effective diameter would be just a few tens of nanometers.

In a specific embodiment, the present method and structure uses a carbon based nanotube. In a specific embodiment, the carbon nanotube-based electrodes and electrode arrays have demonstrated exceptional electrocatalytic activities. The nature of this enhanced electrocatalytic performance relative to other materials, including other forms of carbon, is not clearly understood, but is thought to depend sensitively on defect sites along the walls and at open ends of the nanotubes. These mimic reactive edge planes of highly oriented pyrolytic graphite, allowing for more efficient electrical transfer with electroactive species in solution and faster electrochemical kinetics [50]. Cyclic voltammetry of the $Fe(CN)_6^{3-14-}$ redox couple using bundles of MWNTs as the electrode showed purely Nernstian behavior, with no apparent activation barrier, which is not the case for a platinum electrode [51]. A decreased activation barrier for a carbon nanotube electrode implies that these probes may enable more efficient electrolysis of water at lower voltages, in addition to their use as high-resolution imaging tools. This would limit the possibility of unintended and nonspecific oxidative damage to the functionalized substrate at higher anodic potentials.

Generalized techniques for the growth and attachment of SWNTs as robust and well characterized tools for AFM imaging have been developed. The present method and structure also attaches SWNTs, grown by metal-catalyzed chemical vapor deposition (CVD) on standard substrates, to commercial silicon AFM cantilevers and shortened them via an electrical etching process to achieve the 10-40 nm tube lengths suitable for high-resolution topographical imaging. Both single-wall nanotubes and bundles of SWNTs have been attached to AFM tips by growing individual nanotubes on flat surfaces, and using the silicon probe tip to pick up vertically oriented tubes during imaging of these substrates in tapping mode. These probes have been successfully used for imaging and have achieved lateral resolution as high as 0.5 nm when imaging SWNTs on flat substrates. Finally, SWNTs have been adhesively attached to AFM tips for imaging in liquid environments with uv-curable epoxy (the probes retain their conductivity after curing of the epoxy). The development of SWNT AFM probes.

In a specific embodiment, the SWNT probes can be selectively insulated except at the last few nm by a combination of electrochemical deposition of an insulating polymer in solution followed by electrical etching of the coated nanotube in air. See also an example of a procedure for insulating a multiwall carbon nanotube electrode with polyphenol by cycling the potential on the nanotube between 0 and 1.0V (vs an Ag/AgO reference) in an aqueous phenol solution (pH=0.3) for thirty minutes [52]. Electrical etching of the end of the insulated nanotube can then be performed by application of +5 to +30 V for 20 to 100 μs duration between the AFM probe and a conductive substrate during tapping mode. The high density of electric field lines at the end of the nanotube probe results in specific local etching and surface modification.

Figure 9:
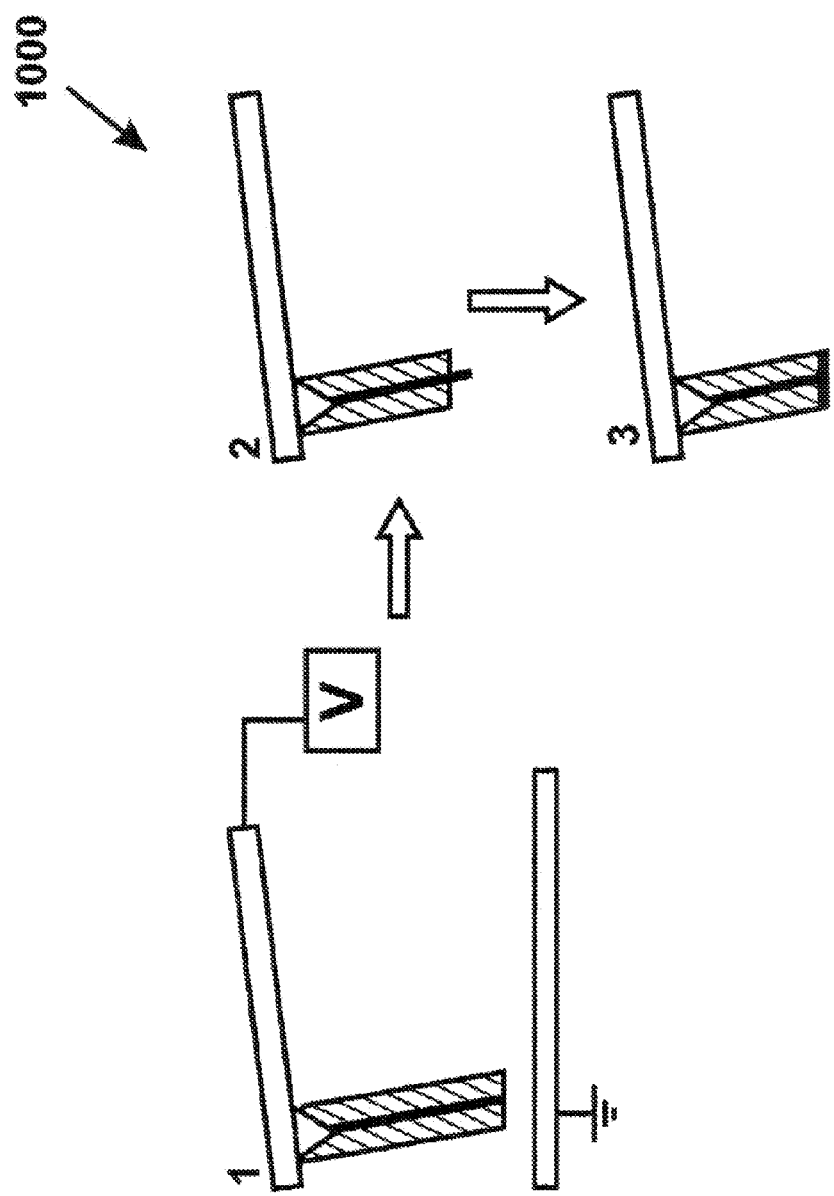
FIG. 9 is a simplified illustration of a process of manufacturing a single carbon nanotube AFM probe according to an embodiment of the present invention.

As merely an example, the present method is illustrated in a simplified set of diagrams 1000 FIG. 9. This diagram is merely an example, which should not unduly limit the scope of the claims herein. One of ordinary skill in the art would recognize other variations, modifications, and alternatives. The exposed end of the nanotube probe can function as the working electrode, or a metal such as silver can be electrodeposited from solution (5 mM $AgNO_3$ in 0.1 M $H_2SO_4$, +200 mV to −80 mV vs Ag wire). Further details of fabricating an individual carbon nanotube can be found in "Method for Manufacturing Single Wall Carbon Nanotube Tips," in the names of Collier, Charles Patrick, et al. and listed under U.S. Patent Application 20050269509, filed Jan. 27, 2005, and hereby incorporated by reference for all purposes. Of course, there can be other variations, modifications, and alternatives.

In a specific embodiment, the present invention provides a system and associated methods for carrying out the functionality described herein. In a specific embodiment, the present system includes an accurate and reproducible positioning of the AFM probe on the nanometer scale, since the synthesis of polymeric sequences such as DNA oligonucleotides requires multiple surface modification steps to be carried out over selected sites, e.g., localized. In a specific embodiment, the system has a closed loop Dimension CL scan head from Digital Instruments, which has an rms uncertainty in the XY plane of about 2 nm. This closed loop scan head was specifically designed for nanomanipulation and nanolithography experiments and can be reversibly mounted on many inverted optical microscopes. In contrast, the standard open loop AFM will typically have drift rates on the order of 0.5 to 1 nm/s, which are primarily due to piezoelectric strain relaxation. This drift would not be a problem for imaging with conventional AFM tips having 5-20 nm radii, but would prevent precise, repetitive positioning of the probe accurately, which will be necessary for patterning specific polymer sequences. Patterning will be performed with the aid of a C++ program called Nanoscript, which generates a series of automated commands sent to the scanner.

Figure 10:
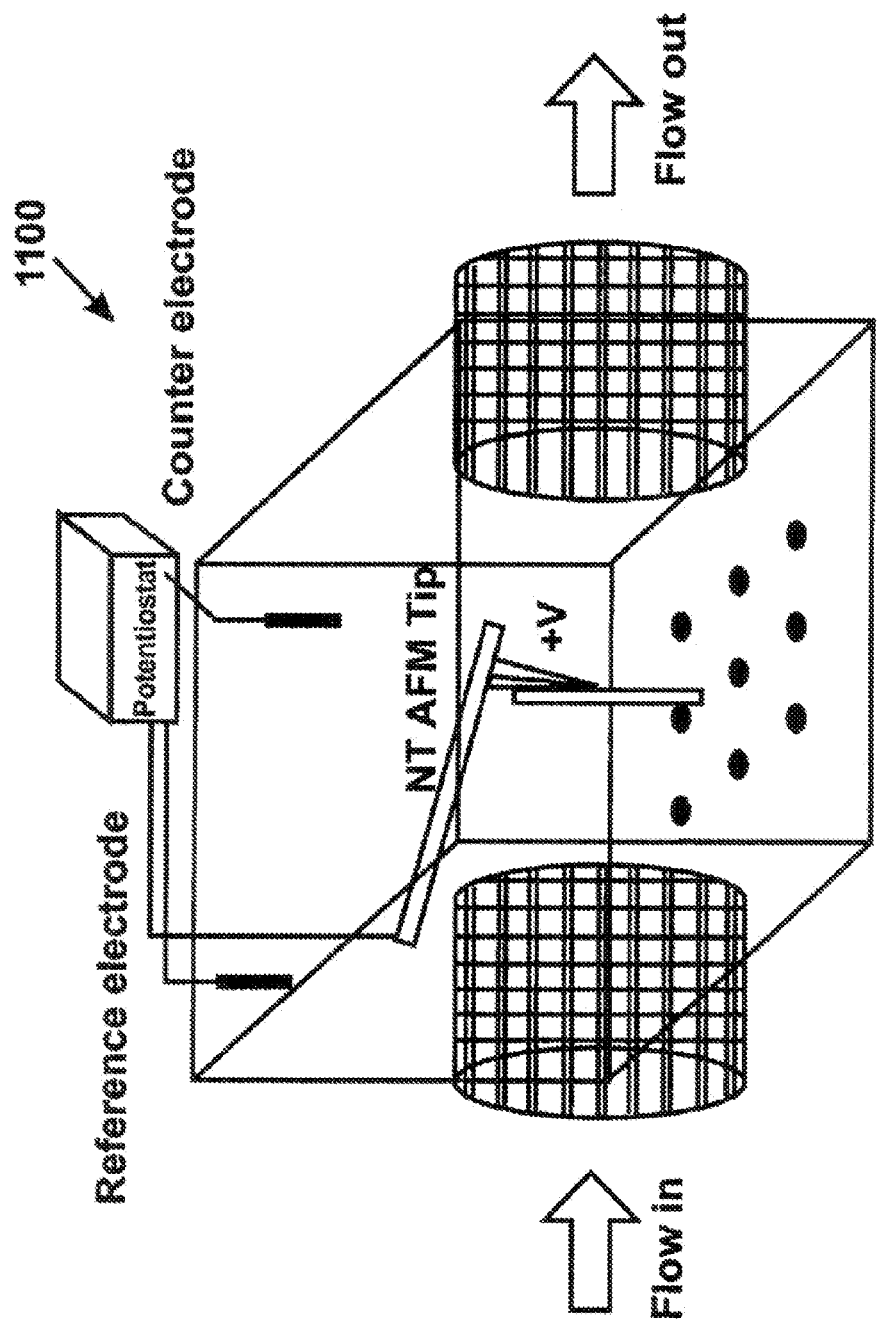
FIG. 10 is a simplified illustration of an AFM system for writing materials according to an embodiment of the present invention.

FIG. 10 is a schematic representation of a system 1000 of an electrochemical cell to perform in situ electrochemical nanolithography with an AFM in solution. This diagram is merely an example, which should not unduly limit the scope of the claims herein. One of ordinary skill in the art would recognize other variations, modifications, and alternatives. Input and output ports are included for rapid exchange of solutions needed for the different steps involved in sequential syntheses. Electrical control of the conductive AFM cantilever assembly as well as a reference and a counter electrode is accomplished through use of a potentiostat. Although it is not indicated in the figure, the top of the cell will be precisely machined in order to mate to the protective skirt assembly of the Dimension AFM scan head as it is lowered down into the cell from above. [The protective skirt is supplied with the scan head for AFM operation in fluids and is designed to prevent liquids from contacting the high voltage electrical connections and piezoelectric elements that position the tip.] For electrical access to the AFM tip in solution, a thin conductive wire can be attached to the leaf spring assembly that holds the cantilever firmly in place in the glass fluid tip holder. In liquids, the excitation energy needed to drive the oscillating cantilever in tapping mode is supplied by an isolated piezoelectric transducer, which does not come into contact with the fluid. Reagents can be selectively introduced into the electrochemical cell using a syringe pump manifold. In a specific embodiment the process is automated as in a DNA synthesizer. Provisions can also be made for incorporating heating elements and a thermostat for temperature control. The present system can be used with any of the features described herein as well as the system above and others. Of course, there can be other variations, modifications, and alternatives.

In order to control the tip-sample forces and prevent degradation of the functionalized surface, during patterning or imaging, the AFM will be operated exclusively in "attractive mode", which is an operating regime where net attractive forces dominate the tip-sample interactions according to a specific embodiment. Often, the attractive force regime involves the absence of physical probe-sample contact (at least in air). High resolution AFM images of the individual segments of antibodies have been obtained in this regime with instantaneous tip-sample forces estimated to be below 400 pN [53]. An AFM can be operated exclusively in this regime simply by limiting the oscillation amplitude of the cantilever to just a few nm. Another parameter that can affect the tip-sample forces in solution phase tapping mode AFM is the Q, or quality factor of the resonance peak of the probe. Q factors are 50-500 times smaller in fluids than in air, due to strong hydrodynamic interactions between the oscillating cantilever and the fluid. This low Q results in the feedback loop of the AFM controller not being able to track damping of the oscillation amplitude of the cantilever as effectively. The result is much higher forces between the tip and the substrate (nanonewtons), and degraded resolution. Inroads have been made however, in increasing the Q factor using an additional feedback control loop, which can be implemented in a straightforward manner [54]. Of course, there can be other variations, modifications, and alternatives.

In a specific embodiment, the present method and system can be applied to a variety of applications. As an example, the present method and system can be applied to tip-induced DMT deprotection, and then incorporating coupling reactions to form dimers, trimers and so forth at precisely defined locations. Conventional phosphoramidite coupling can be used to functionalize the entire surface of a glass substrate with deoxyribothymidine (dT) phosphotriester via a suitable linker molecule, like a poly(ethylene glycol) silane (PEG-silane). The dT molecules carry a DMT group on the 5' hydroxyl. After removal of the DMT groups with acid generated by the nanoprobe functioning as a nanoelectrode in aqueous buffer, the resulting patterns can be detected via height changes or phase angle changes in tapping mode AFM, or friction changes with lateral force microscopy (LFM). These methods can be carried out in air or in solution, depending on which environment offers the greatest contrast. Conventional metal-coated vs nanotube mounted scanning probes will be directly compared and characterized fully at this stage, as patterning tools as well as imaging tools. Insulated and non-insulated probes of both types will be developed and characterized.

In an alternative specific embodiment, the present method and system can be used for a single coupling reaction of a second phosphoramidite to patterned areas to form dimers. The second monomer would have a fluorophore attached for detection with an epifluorescent optical microscope. AFM imaging and fluorescence detection would be complementary: the resolution of the nanoscopic patterns can be determined by AFM, while fluorescence imaging indicates the extent and specificity of the coupling reaction. The spacing of the array sites at this stage will have to be larger than the diffraction limit of the optical microscope (0.5 to 1 µm).

In yet an alternative embodiment, the present method and system can be used for testing the fidelity of a combinatorial array with four different fluorescently labeled oligonucleotide probes that are complementary to oligonucleotides synthesized on the array, using an epifluorescent microscope. Non-specific absorption can be discriminated against by washing the substrate with deionized water at 70° C. The oligonucleotides should be at least 15-mers to ensure fidelity of the hybridization reactions. Of course, there can be other variations, modifications, and alternatives.

Although the above has been described in terms of specific methods and systems, there can be other variations, modifications, and alternatives. Additionally, certain aspects of the present methods and systems can be highlighted as follows. As an example, the present methods and system can be used for 1. Electron donation or acceptance by the probe to trigger a change in reaction rate or direction in the local fluid environment or a small area of a substrate.

2. Induce via probe electric field polarity in a targeted molecule or molecular assembly (either in fluid or in a small area of a substrate) a local change in reaction rate of direction.

3. Utilize electrolysis of a buffered water solution to achieve very tight local confinement of a highly enriched proton or hydroxide (OH—) concentration (i.e. change the local pH up or down) to effect a change in reaction rate or direction in the local fluid environment or a small area of a substrate.

Each of the above may be either to produce a final product, a molecular or chemical step in a process, to deprotect (activate) a molecule or substrate active area or to protect (passivate) a molecule or substrate active area. Of course, there can be other variations, modifications, and alternatives. Although the fluid has been described above, it can be a solution of water with other active and passive chemical components. The solution may contain salts, proteins, and or materials to enable pH buffering. The buffering can serve to quench an electroactive species within nanoseconds or nanometers. Variations of the substrate can also exist. As an example, the substrate can be any solid or gelled material or it may be stabilized by hydrophobic behavior (e.g. bilayered lipid membranes) or hydrophilic behavior and may be coated with one of more materials. Of course, there can be other variations, modifications, and alternatives.

Additionally, the present method and system uses an application of the electric potential, which can vary as well, according to a specific embodiment. By application of an electric potential, either positive or negative, a local change in pH is enabled relative to the greater fluid environment and or the substrate. The pH change can made the local environment proximate to the probe either more acidic or more alkaline according to a specific embodiment. The pH change could be made to effect nanoscale chemical patterning or functionality of a substrate, or to create or modify one or more active areas or elements of a nanoarray or molecular circuit. In addition, it could be used to produce or modify a molecular species of interest within a fluid. Through the change in local environment reaction rates can be significantly affected. The change can be to stop or preclude a local reaction or more commonly to increase the rate of a local reaction. The change could be accomplished via electron donation. Alternately, the electric field can change or stabilize the polar orientation of a molecule or the strength of its polarity or the strength of a polar region within a larger protein or protein assembly to accomplish these changes in reaction rate. Of course, there can be other variations, modifications, and alternatives.

In a specific embodiment, other variations to the present method and system can be included. Depending on tip location relative to the substrate these changes could affect the tip and it's structure and any attached molecules, and the surrounding fluid media and its contents, and potentially the surface or near-surface of the substrate. If the fluid is buffered, the potential could be used to achieve electrolysis of one or more water molecules in the surrounding fluid that is extremely localized. The diffusion field of the free acid will be limited to just a few nanometers beyond the physical surface of the probe by rapid reactions of the electrogenerated proteins with the conjugate base of a weak acid (buffer). In the case of interactions with DNA molecules, the field will be sufficiently limited such as to remove acid labile dimethoxytrityl (DMT) protecting groups from the 5' ends of oligonucleotides while leaving intact the acid labile protecting groups on the substrate or in the fluid outside the tip interaction region. In addition this local electric or pH region can be used to deprotect a protein or other enzyme or passivation substance near the tip while leaving intact those outside the tip interaction region. Alternately local pH control can be used to facilitate addition of functional molecules or groups to patterned substrates or to create such patterning. The resulting active area of this process can be unique relative to the surrounding fluid and substrate materials and even relative to the rest of a patterned nanoarray or circuit. Additionally, this technique could be used to deposit material or an ultra-thin hydrated layer in a high-resolution nano-pattern. Of course, there can be other variations, modifications, and alternatives.

Alternately in a specific embodiment, the system is operated in a feedback mode in which the tip is held close to the substrate in a solution containing one form of a redox pair that functions as an electroactive mediator. The mediator serves both as a means for controlling tip position relative to the substrate by ionic current and as a way to drive specific electrochemical reactions to pattern the substrate. The tip current can be perturbed by the presence of the substrate by blockage of diffusion of the mediator to the tip (negative feedback) or by regeneration of mediator at the substrate (positive feedback). Of course, there can be other variations, modifications, and alternatives.

In yet an alternative specific embodiment, the present invention provides a method for using an array of molecules, which is briefly outlined below. As will be illustrated the method is directed to processing an array of active regions for use in reacting one or more species in at least two of the active regions in a sequential process and/or other processes according to an embodiment of the present invention.

1. Provide a substrate member, which has a surface region, the surface region, a first active region formed overlying a first portion of the surface region and a second active region formed overlying a second portion of the surface region, a spatial distance separating the first active region and the second active region, the spatial distance being characterized by a dimension of 1 micron and less;

2. Subject the first active region, the second active region, and the spatial distance with a fluid material;

3. Dispense a reactant species within the fluid material;

4. Cause movement of the reactant species from the first active region to the second active region over the spatial distance of 1 micron and less within a time of less than 10 microseconds; and 5. Optionally, change a configuration of the reactant species from a first state to a second state as the reactant species moves from the first active region to the second active region or maintain a configuration of the reactant species between the first active region to the second active region, while initiating change upon interacting the reactant species with the second active region; and 6. Perform other steps, as desired.

The above sequence of steps provides a method according to an embodiment of the present invention. As shown, the method uses a combination of steps including a way of using a first active region and a second active region immersed in a fluid material according to an embodiment of the present invention. In a specific embodiment, the active regions have been formed using an AFM probe tip, which has been immersed in one or more ink species. Other alternatives can also be provided where steps are added, one or more steps are removed, or one or more steps are provided in a different sequence without departing from the scope of the claims herein. Additionally, the present method can be applied to other applications that are not for AFM techniques. Further details of the present method according to the present invention can be found throughout the present specification and more particularly below.

Figure 11:
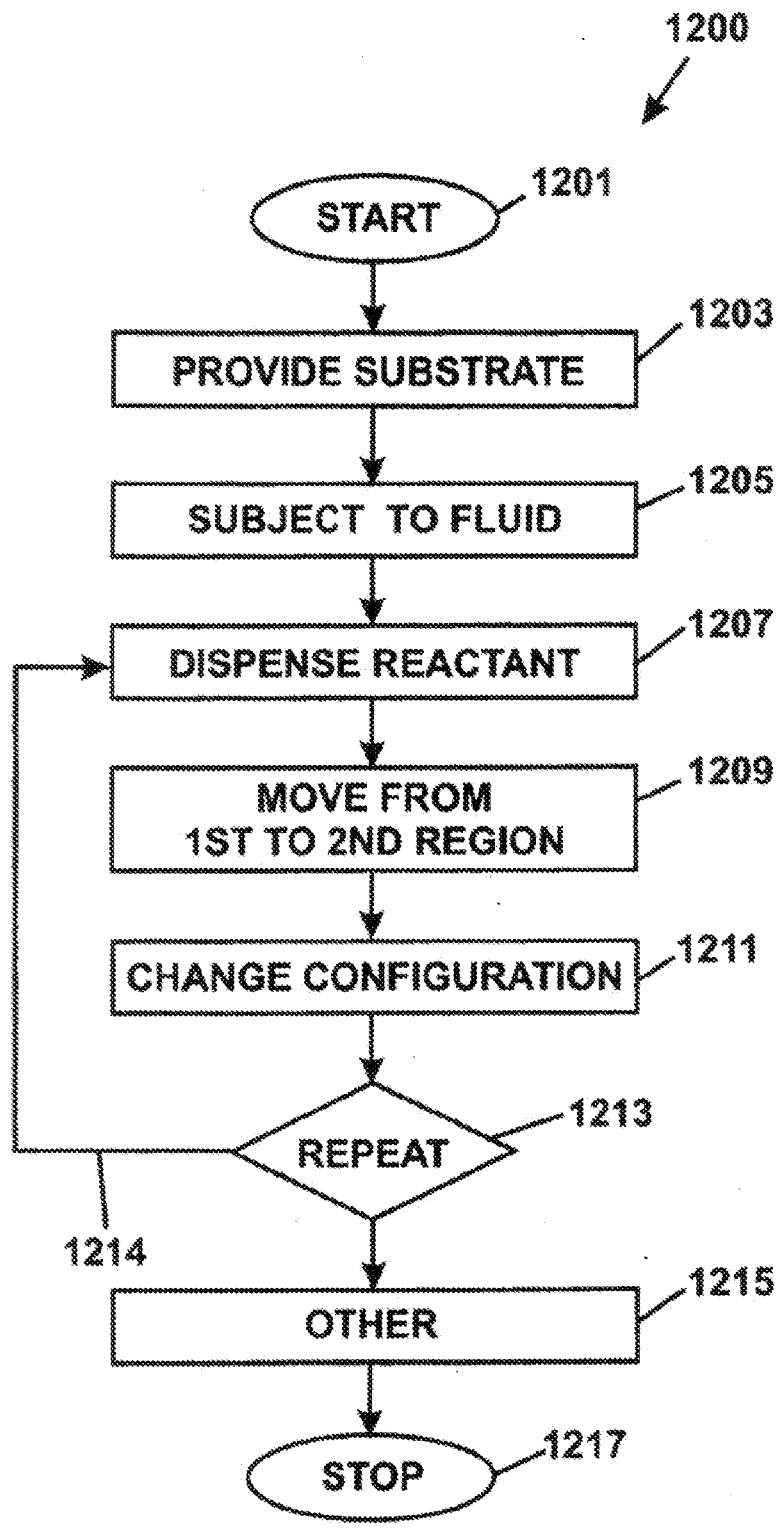
FIG. 11 is a simplified flow diagram of a method of using an array of materials according to an embodiment of the present invention.

FIG. 11 is a simplified flow diagram 1200 of a method of using an array of materials according to an embodiment of the present invention. This diagram is merely an example, which should not unduly limit the scope of the claims herein. One of ordinary skill in the art would recognize other variations, modifications, and alternatives. As illustrated the method is directed to processing an array of active regions for use in reacting one or more species in at least two of the active regions in a sequential process and/or other processes according to an embodiment of the present invention. In a specific embodiment, the method begins at start, step 1201.

In a specific embodiment, the method includes providing (step 1203) a substrate member, which has a surface region. In a specific embodiment, a first active region is formed overlying a first portion of the surface region and a second active region is formed overlying a second portion of the surface region. In a preferred embodiment, a spatial distance separates the first active region and the second active region. In a specific embodiment, a non-reactive and/or non-active region separates the first and second active regions. The terms "active" and "non-reactive" are to be interpreted by one of ordinary skill in the art, including those specific descriptions provided herein. Such terms are not intended to be limiting the scope of the claims herein and are to be given ordinary interpretations that are known by a person of ordinary skill in the art. Depending upon the embodiment, the substrate can have various features that have been described in the present specification including variations, alternatives, and modifications, which would be understood by one of ordinary skill in the art.

In a specific embodiment, the substrate can be homogeneous and/or layered and/or a composite. The substrate can be a glass, quartz, fused silica, silicon, plastic, ceramic, any combination of these, and the like, according to a specific embodiment. The substrate has a silane material overlying the surface region. Depending upon the embodiment, the silane material can be a blanket layer and/or patterned according to the embodiment. In a most general embodiment, the substrate has an overlying layer of material, which can be used as a starting point for building a plurality of active regions thereon. Of course, there can be other variations, modifications, and alternatives.

In a specific embodiment, the substrate has a first active region formed overlying a first portion of the silane material. In a specific embodiment, the first active region has one or more first biological molecules, chemical molecules, enzymes, proteins, semiconductor molecules, conductive molecules, any combination of these and/or other species of these entities, and the like. In a specific embodiment, the first active region has a first dimension of less than 1 micron in size and has one or more first molecules capable of binding to the first portion of the silane material. Of course, there can be other variations, modifications, and alternatives.

In a specific embodiment, the substrate has a second active region formed overlying a second portion of the silane material. In a specific embodiment, the first active region has one or more second biological molecules, chemical molecules, enzymes, proteins, semiconductor molecules, conductive molecules, any combination of these and/or other species of these entities, and the like. Here, the terms "first" and "second" are not intended to be limiting. In a preferred embodiment, the first and second active regions are different types of regions. The second active region has a second dimension of less than 1 micron in size and has one or more second molecules capable of binding to the second portion of the active region. In a specific embodiment, a spatial distance is separating a first active region and a second active region. In a preferred embodiment, the spatial distance is characterized by a dimension of 1 micron and less. Of course, there can be other variations, modifications, and alternatives.

Depending upon the embodiment, various techniques can be used to form the active regions. In a preferred embodiment, the first active region is provided by a first dip pen process. In a preferred embodiment, the second active region is provided by a first dip pen process. In a specific embodiment, the dip pen process uses an AFM probe including a single strand carbon nanotube, but can be others, depending upon the specific application. Additionally, the first and second dip pen processes can be the same, similar, or use different inks and other parameters, such as solutions, temperatures, sizes, and other characteristics. Of course, there can be other variations, modifications, and alternatives.

In a specific embodiment, the active regions are spatially separated from each other by a determined dimension. In a specific embodiment, the active regions are spatially separated by 100 nm or less. In an alternative embodiment, the active regions are spatially separated by 30 nm or less. Depending upon the embodiment, one active region can be separated by almost any dimension to another active region using the dip pen process. That is, the dip pen process allows for any desired dimension between any two or more than two active regions according to a specific embodiment. Of course, there can be other variations, modifications, and alternatives.

Additionally, each of the active regions has a determined size and/or spot size according to a specific embodiment. In a specific embodiment, the active regions have dimension of less than 300 nm in size. In an alternative specific embodiment, the active regions have dimension of less than 100 nm in size. In yet an alternative embodiment, the active regions have dimension of less than 30 nm in size. Using the present dip pen process, the size of the active region can vary on the substrate according to a specific embodiment. That is, the size can be the same and/or similar among active regions or substantially different in size between two or more active regions according to a specific embodiment. Of course, there can be other variations, modifications, and alternatives.

In a specific embodiment, the first region and second region are provided in an array configuration. Here, the first region and the second region are two of a plurality of active regions in an array configuration according to a specific embodiment. Alternatively, the first region and the second region are two of a plurality of active regions in a circuit configuration, which may be in series and/or parallel, depending upon the specific embodiment. In a specific embodiment, where the second region or one or more active regions are in the array or circuit configuration, one or more of the active regions can be for detection and/or monitoring capability. In a specific embodiment, either direct readout (e.g., electrical, optical, physical) and/or production of a molecule that can be detected through a photon emission and/or electrical signal at yet another region can be included. In a specific embodiment, the present detection technique can detect a consequential and/or incidental product (e.g., waste) rather than a molecule species and/or molecule of interest to avoid damaging or slowing it. In a specific embodiment, a two component fluorophore can be used for monitoring and/or detection. Of course, there can be other variations, modifications, and alternatives.

In a specific embodiment, the method includes subjecting (step 1205) the first active region, the second active region, and the spatial distance with a fluid material. In a specific embodiment, the method immerses an entirety of the surface region of the substrate and/or immerses the entire substrate itself. In a specific embodiment; the fluid material can be a liquid, vapor, a gas, any combination of these, and the like. In a specific embodiment, the fluid material can be an ultra-clean water (e.g., pH=7), an acid solution, a basic solution, an organic solution, and/or others. Additionally, the fluid material can be subjected to thermal energy (e.g., heating) in a global and/or patterned format according to a specific embodiment. In a specific embodiment, the thermal energy can be ramped, cycled, and/or other time dependant and/or spatially dependant formats. In a specific embodiment, the fluid material can also be moving and include a convective characteristic, e.g., flow. Depending upon the specific embodiment, the flow characteristic can be laminar, turbulent, plug, and/or other forms and combination of forms depending upon the specific application. Of course, there can be other variations, modifications, and alternative.

In a specific embodiment, the present method dispenses a reactant species within the fluid material. In a specific embodiment, the reactant species can be provided in addition to the fluid material and/or within and/or a part of the fluid material depending upon the application. In a specific embodiment, the reactant species can be a chemical entity, a biological entity, a physical entity, and/or any combination of these, and the like. Other examples of reactant species can be found throughout the present specification. That is, the reactant species is comprised of one or more organic or biological molecules according to a specific embodiment. In a specific embodiment, some part of the reactant species is modified or bound by the first region. Of course, there can be other variations, modifications, and alternative.

In a specific embodiment, the method includes causing movement of the reactant species from the first active region to the second active region over the spatial distance of 1 micron and less within a time of less than 10 microseconds. Depending upon the embodiment, there can be other dimensions and other time periods, without departing from the scope of the claims herein. In a preferred embodiment, the close spatial distance allows for movement of the reactant species, which may change in form and/or configuration, greater than a time period of about 10 micro-seconds. That is, the reactant species, which has a selected configuration and/or form at the first active region, is of a substantially similar and/or same configuration and/or form at the second active region, which then allows for the reactant species to interact with the second active region. In a specific embodiment, the movement is provided by a diffusion process (e.g., concentration gradient) of the reactant species from the first active region to the second active region. Alternatively, the spatially movement is provided by a convection process of the reactant species from the first active region to the second active region. Alternatively, the movement is caused by any combination of diffusion and/or convection and/or other processes, e.g., physical placement. Of course, there can be other variations, modifications, and alternatives.

Referring to step 1211, the method changes a configuration of the reactant species from a first state to a second state as the reactant species moves from the first active region to the second active region. In a preferred embodiment, the reactant species does not change configuration during a time frame between interacting with the first active region and the second active region, but changes configuration upon interacting with the second active region. In a specific embodiment, the reactant species (e.g., modified or not) is released by the first active area and then binds at the second active area. In a specific embodiment, the reactant species, which can be modified, is enabled by modification of another constituent of the reactant species, e.g., ATP. Of course, there can be other variations, modifications, and alternatives.

In a specific embodiment, the method includes repeating (step 1213) certain steps, 1207, 1209, and 1211 via branch 1214. Alternatively, one or more of these steps, and others can be repeated according to a specific embodiment. In yet an another embodiment, other steps can be added and/or inserted to any of these steps. In a specific embodiment, the method can also perform yet other (step 1215) processes. Of course, there can be other modifications, alternatives, and variations.

In a specific embodiment, the other process can be associated with a detection process associated with the reactant species. In a specific embodiment, the method includes a result, which is detection of less than 100 molecules of one species and configuration. In a specific embodiment, the method includes a result, which is detection of as few as 1 molecule of a species or configuration. In a specific embodiment, the method includes a result, which is production or creation of a specific molecule. In a specific embodiment, the method includes a result, which is chemical accomplishment of a logical function. In one or more embodiments, the logical function includes an output that can be switched via binding at some point in the array or circuit of an alternate reactive species. In a specific embodiment, the method includes a result, which is accomplished though any combination of molecular production, detection/monitoring and logical function, or other processes. In a specific embodiment, the method stops at step 1217. Of course, there can be other modifications, variations, and alternatives.

The above sequence of steps provides a method according to an embodiment of the present invention. As shown, the method uses a combination of steps including a way of using a first active region and a second active region immersed in a fluid material according to an embodiment of the present invention. In a specific embodiment, the active regions have been formed using an AFM probe tip, which has been immersed in one or more ink species. Other alternatives can also be provided where steps are added, one or more steps are removed, or one or more steps are provided in a different sequence without departing from the scope of the claims herein. Additionally, the present method can be applied to other applications that are not for AFM techniques. Of course, there can be other variations, modifications, and alternatives. Other examples of the present method and system can be found throughout the present specification and more particularly below.

REFERENCES

1. Ivanisevic, A.; Im, J.-H.; Lee, K.-B.; Park, S. J.; Demers, L. M.; Watson, K. J.; Mirkin, C. A.: "Redox-Controlled Orthogonal Assembly of Charged Nanostructures," *J. Am. Chem. Soc.* 2001, 123, 12424-12425, http://pubs.acs.org/journals/jacsat/.
2. McGrath, K.; Butler. M. M.: "Self-Assembling Protein Systems: A Model for Materials Science," in *Protein-Bared Materials*, McGrath, K.; Kaplan, D., Ed.; Birkhaiiser: Boston, 1997.
3. Bhalla, U.S.; Iyengar, R.: "Emergent Properties of Networks of Biological Signaling Pathways", Science 1999, 283, 381-387, http://www.sciencern_ag.org/.
4. Wilson, D. L.; Martin, R.; Hong, S.; Cronin-Golomb, M.; Mirkin, C. A.; Kaplan, D. L.: "Surface Organization and Nanopatterning of Collagen by Dip-Pen Nanolithography," *Proc. Natl. Acad. Sci. U.S.A.* 2001, 98, 13660-13664, http://www.pnas.org/.
5. Hunkapiller, M.; Kent, S.; Caruthers, M.; Dreyer, W.; Firca, J.; Giffin, C.; Horvath, S.; Hunkapiller, T.; Tempst, P.; Hood, L.: "A Microchemical Facility for the Analysis and Synthesis of Genes and Proteins," *Nature* 1984, 310, 105-111.
6. Egeland, R. D.; Marken, F.; Southern. E. M.: "An Electrochemical Redox Couple Activated by Microelectrodes for Confined Chemical Patterning of Surfaces," *Anal. Chem.* 2002, 74, 1590-1596, http://pubs.acs.org/journals/ancham/.
7. Montgomery, D.: "Electrochemical Solid Phase Synthesis," U.S. Pat. No. 6,093,302; Jul. 25, 2000.
8. Marck, C.; Borgwarth, K.: Heinze, J.: "Generation of Polythiophene Micropatterns by Scanning Electrochemical Microscopy," *Chem. Mater.* 2001, 13, 747-752, http://pubs.acs.org/journals/cmatex/.
9. Piner, R. D.; Jin, Z., Feng, X.; Hong, S.; Mirkin, C. A.: "Dip-Pen Nanolithography," *Science* 1999, 283, 661-663, http://www.sciencemag.org/.
10. Su, M.; Liu, X.; Dravid, V. P.; Mirkin, C. A.: "Moving beyond Molecules: Patterning Solid-State Features via Dip-Pen Nanolithography with Sol-Based Inks," *J. Am. Chem. Soc.* 2002, 124, 1560-1561, http://pubs.acs.org/journals/jacsat/.
11. Demers, L. M.; Ginger, D. S.; Park, S.-J.; Li, Z.; Chung, S.-W.; Mirkin, C. A.: "Direct Patterning of Modified Oligonucleotides on Metal and Insulators by Dip-Pen Nanolithography," *Science* 2002, 296, 1836-1838, http://www.sciencemag.org/.
12. Lee, K.-B.; Lim, J.-H.; Mirkin. C. A.: "Protein Nanostructures Formed via Direct-Write Dip-Pen Nanolithography," *J. Am. Chem. Soc.* 2003, 125, 5588-5589, http://pubs.acs.org/journals/jacsat/.
13. Cheung, C. L.; Camarero, J. A.; Woods, B. W.; Lin, T.; Johnson. J. E.; DeYoreo, J. J.: "Fabrication of Assembled Virus Nanostructures on Templates of Chemoselective Linkers Formed by Scanning Probe Nanolithography," *J. Am. Chem. Soc.* 2003, 125, 6848-6849. http://pubs.acs.org/journals/jacsat/.
14. Li, Y.; Maynor, B. W.; Liu, J.: "Electrochemical 'Dip-Pen' Nanolithography," *J. Am. Chem. Soc.* 2001, 123, 2105-2106, http://pubs.acs.org/journals/jacsat/.
15. Hurley, P. T.; Ribbe, A. E.; Buriak, J. M.: "Nanopatterning of Alkynes on Hydrogen-Terminated Silicon Surfaces by Scanning Probe-Induced Cathodic Electrografting," *J. Am. Chem. Soc.* 2003, 125, 11334-11339, http://pubs.acs.org/journals/jacsat/.
16. Pavlovic, E.; Oscarsson, S.; Quist, A. P.: "Nanoscale Site-Specific Immobilization of Proteins through Electroactivated Disulfide Exchange," *Nano Lett.* 2003, 3, 779-781, http://pubs.acs.org/journalslnalefd/.
17. Liu, S.; Maoz, R.; Schmid, G.; Sagiv, J.: "Template Guided Self-Assembly of [Au55] Clusters on Nanolithographically Defined Monolayer Patterns," *Nano Lett* 2002, 2, 1055-1060, http://pubs.acs.org/journalsinalefd/.
18. Bard, A.: "Introduction and Principles," in *Scanning Electrochemical Microscopy*, Bard, A. J; Mirkin, M. V., Eds.; Marcel Dekker: New York, 2001; Chapter 1.
19. Liu, G-Y.: Xu, S.; Qian, Y.: "Nanofabrication of Self-Assembled Monolayers Using Scanning Probe Lithography," *Acc. Chem. Res.* 2000, 33, 457-466, http://pubs.acs.org/journals/achre4/.
20. Wadu-Mesthrige, K.; Amro, N. A.; Garno, J. C.; Xu, S.; Liu, G.-Y.: "Fabrication of Nanometer-Sized Protein Patterns Using Atomic Force Microscopy and Selective Immobilization," *Biophys. J.* 2001, 80, 1891-1899, http://www.biophysj.org/.
21. Rozhok, S.; Piner, R.; Mirkin, C. A.: "Dip-Pen Nanolithography: What Controls Ink Transport?" *J. Phys. Chem. B* 2003, 107, 751-757, http://pubs.acs.org/journals/ipcbfk/.
22. Forouzan, F.; Bard, A. J.: "Evidence for Faradaic Processes in Scanning Probe Microscopy on Mica in Humid Air," *J. Phys. Chem. B* 1997, 101, 10876-10879, http://pubs.acs.org/journals/jpcbfk/.
23. Mandler, D.: "Micro- and Nanopatterning Using the Scanning Electrochemical Microscope," in *Scanning Electrochemical Microscopy*, Bard, A. J; Mirkin, M. V., Eds.; Marcel Dekker: New York, 2001; Chapter 13.
24. Borgwarth, K.; Heinze, J.: "Increasing the Resolution of the Scanning Electrochemical Microscope Using a Chemical Lens: Application to Silver Deposition," *J. Electrochem. Soc.* 1999, 146, 3285-3289, http://www.electrochem.org/publications/jes/journal.htm.
25. Hess, C.; Borgwarth, K.; Ricken, C.; Ebling, D. G.; Heinze, J.: "Scanning Electrochemical Microscopy: Study of Silver Deposition on Non-Conducting Substrates," *Electrochim. Acta* 1997, 42, 3065-3073, http://www.sciencedirect.com/web-editions/journal/00134686.
26. Zu, Y. B.; Xie, L.; Mao, B. W.; Tian, Z. W.: "Studies on Silicon Etching Using the Confined Etchant Layer Technique," *Electrochim. Acta* 1998, 43, 1683-1690, http://www.sciencedirect.com/web-editions/journal/00134686.
27. Zhou, J.; Wipf, D. O.: "Deposition of Conducting Polyaniline Patterns with the Scanning Electrochemical Microscope," *J. Electrochem. Soc.* 1997, 144, 1202-1207, http://www.electrochem.org/publications/jes/journal.htm.
28. Shiku, H.; Uchida, I.; Matsue, T.: "Microfabrication of Alkylsilanized Glass Substrate by Electrogenerated Hydroxyl Radical Using Scanning Electrochemical Microscopy," *Langmuir* 1997, 13, 7239-7244, http://pubs.acs.org/journals/langd5/.
29. Staufer, U., in *Scanning Tunneling Microscopy II*, Wiesendanger, R.; Gunterodt, H.-J., Eds.; New York: Springer-Verlag, 1992; pp 273-302.
30. Fan, F.-R.-F.; Bard, A.: "Electrochemical Detection of Single Molecules," *Science* 1995, 267, 871-874.
31. Shao, Y.; Mirkin, M. V.; Fish, G.; Kokotov, S.; Palanker, D.; Lewis, A.: "Nanometer-Sized Electrochemical Sensors," *Anal. Chem.* 1997, 69, 1627-1634, http://pubs.acs.org/journals/ancham/.
32. Wipf, D. O.: "Instrumentation," in *Scanning Electrochemical Microscopy*, Bard, A. J; Mirkin, M. V., Eds.; Marcel Dekker: New York, 2001; Chapter 2.
33. Macpherson, J. V.; Unwin, P. R.: "Combined Scanning Electrochemical-Atomic Force Microscopy," *Anal. Chem.* 2000, 72, 276-285, http://pubs.acs,org/journals/langd5/.
34. James, P.; Casillas, N.; Smyrl, W. H.: "Simultaneous Scanning Electrochemical and Photoelectrochemical Microscopy by Use of a Metallized Optical Fiber," *J. Electrochem. Soc.* 1996, 143, 3853-3866, http://www.electrochem.org/publications/jes/journal.him.
35. Sam, M.; Boon, E. M.; Barton, J. K.; Hill, M. G.; Spain, E. M.: "Morphology of 15-mer Duplexes Tethered to Au(111) Probed Using Scanning Probe Microscopy," *Langmuir* 2001, 17, 5727-5730, http://pubs.acs.org/journals/langd5/.
36. Hong, S.; Mirkin, C. A.: "A Nanoplotter with Both Parallel and Serial Writing Capabilities," *Science* 2000, 288, 1808-1811, http://www.sciencemag.org/.
37. Melosh, N. A.; Boukai, A.; Diana, F.; Gerardot, B.; Badolato, A.; Petroff, P. M.; Heath, J. R.: "Ultrahigh-Density Nanowire Lattices and Circuits," *Science* 2003, 300, 112-115, http://www.sciencemag.org/.
38. Pirrung, M. C.: "How to Make a DNA Chip," *Angew. Chem. Int. Ed.* 2002, 41, 1276-1289, http://www3.interscience.wiley.com/cgi-bin/jhome/26737.
39. Houseman, B. T.; Huh, J. H.; Kron, S. J.; Mrksich, M.: "Peptide Chips for the Quantitative Evaluation of Protein Kinase Activity," *Nat. Biotechnol.* 2002, 20, 270-274, http://www.nature.com/nbt/.

40. Lee, Y.-S.; Mrksich, M.: "Protein Chips: From Concept to Practice," *Trends Biotechnol.* 2002, 20, S14-S18, http://www.sciencedirect.com/science/journal/01677799.

41. Crooks. J. E.: "Fast and Slow Proton-Transfer Reactions in Solution," in *Proton-Transfer Reactions*, Caldin, E.; Gold, V., Eds. New York: John Wiley & Sons 1975; Chapter 6.

42. Tian, Z.; Fen, Z.; Tian, Z.; Zhuo, X.; Mu, J.; Li, C.; Lin, H.; Ren, B.; Xie, Z.; Hu, W.: "Confined Etchant Layer Technique for Two-Dimensional Lithography at High Resolution using Electrochemical Scanning Tunneling Microscopy," *Faraday Discuss.* 1992, 94, 37-44.

43. Dai, H.; Hafner, J. H.; Rinzler, A. G.; Colbert, D. T.; Smalley, R. E.: "Nanotubes as Nanoprobes in Scanning Probe Microscopy," *Nature* 1996, 384, 147-150.

44. Stevens, R.; Nguyen, C.; Cassell, A.; Delzeit, L.; Meyyappan, M.; Han, J.: "Improved Fabrication Approach for Carbon Nanotube Probe Devices," *Appl. Phys. Lett.* 2000, 77, 3453-3455, http://ojps.aip.org/aplo/.

45. Hall, A.; Matthews, W. G.; Superfine, R.; Falvo, M. R.; Washburn, S.: "Simple and Efficient Method for Carbon Nanotube Attachment to Scanning Probes and Other Substrates," *Appl. Phys. Lett.* 2003, 82, 2506-2508, http://ofps.aip.org/aplo/.

46. Hainer, J. H.; Cheung, C.-L.; Oosterkamp, T. H.; Lieber, C. M.: "High-Yield Assembly of Individual Single-Walled Carbon Nanotube Tips for Scanning Probe Microscopies." *J. Phys. Chem. B* 2001, 105, 743-746, http://pubs.acs.org/journals/jpcbfk/.

47. Snow, E. S.; Campbell, P. M.; Novak, J. P.: "Single-Wall Carbon Nanotube Atomic Force Microscope Probes." *Appl. Phys. Lett.* 2002, 80, 2002-2004, http://oips.aip.org/a.plo/.

48. Gotoh, Y.; Matsumoto, K.; Maeda, T.; Cooper, E. B.; Manatis, S. R.; Minne, S. C.; Hunt, T.; Dai, H.; Quate, C. F.: "Experimental and Theoretical results of Room-Temperature Single-Electron Transistor Formed by the Atomic Force Microscope Nano-Oxidation Process", *J. Vac. Sci. Technol. A* 2000, 18, 1321-1325, http://oips.aip.org/jvst/.

49. Wilson, N. R.; Macpherson, J. V.: "Single-Walled Carbon Nanotubes as Templates for Nanowire Conducting Probes," *Nano Lett.* 2003, 3, 1365-1369, http://pubs.acs.org/journals/nalefd/.

50. Gooding, J. J.; Wibowo, R.; Liu, J.; Yang, W.; Losic, D.; Orbons, S.; Mearns, F. J.; Shapter, J. G.; Hibbert, D. B. "Protein Electrochemistry Using Aligned Carbon Nanotube Arrays", *J. Am. Chem. Soc.* 2003, 125, 9006-9007, http://pubs.acs.org/journals/jacsat/.

51. Nugent, J. M.; Santhanam, K. S. V.; Rubio, A.; Ajayan, P. M.: "Fast Electron Transfer Kinetics on Multiwalled Carbon Nanotube Microbundle Electrodes," *Nano Lett.* 2001, 1, 87-91, http://pubs.acs.org/journal/nalefd/.

52. Campbell, J. K.; Sun, L.; Crooks, R. M.: "Electrochemistry Using Single Carbon Nanotubes,". I. *Am. Chem. Soc.* 1999, 121, 3779-3780, http://pubs.acs.orgijournals/jacsat/.

53. San Paolo, A.; Garcia, R.: "High-Resolution Imaging of Antibodies by Tapping-Mode Atomic Force Microscopy: Attractive and Repulsive Tip-Sample Interaction Regimes," *Biophys. J.* 2000, 78, 1599-1605, http://www.biophvsi.org/.

54. Tamayo, J.; Humphris, A. D. L.; Owen, R. J.; Miles, M. J.: "High-Q Dynamics Force Microscopy in Liquid and Its Application to Living Cells," *Biophys. J.* 2001, 81, 526-537, http://www.biophysj.org/.

Experiments:

To prove the principles and operation of the present invention, we performed various experiments. These experiments have been used to demonstrate the invention and certain benefits associated with the invention. As experiments, they are merely examples, which should not unduly limit the scope of the claims herein. One of ordinary skill in the art would recognize many variations, alternatives, and modifications. Details of these experiments are provided below.

We achieved a breakthrough in the discovery of life on other planets and also uncover things about our present planet. On an aggressive timescale, we desired suites of novel sensors, based on the mature chemical techniques of the protein and DNA microarray industry, using certain nanolithographic techniques that we have developed. We laid the foundation for future life-detection missions and to enhance the science yield of sample return missions by fabricating several critical proof-of-concept nanodevices with dip-pen nanolithography technology (DPN). We use carbon nanotube Atomic Force Microscope (AFM) probes for the first time as pens to write protein and DNA aptamer 'inks' on glass substrates functionalized with silane-based self-assembled monolayers. This enables fabrication of extremely fine patterns of detectors suitable for multicolor imaging of single-molecule samples at resolutions far below the diffraction limit. By extremely compact sensors suitable for characterizing subnanoliter sample volumes typical of State-of-the-Art (SoA) microfluidics devices,[1] an opportunity is created for further interrogation of hiosignatures via Raman imaging, time-of-flight fluorescence imaging, probing via functionalized nanotube sensors, nanotube-based electrical probes, molecular recognition chemistry via antibodies, etc. The power of this technique is its ability to rapidly interrogate, with high selectivity, very sparse samples: either via active molecular circuit interactions or by holding them for further detailed examination by a comprehensive suite of complementary analytical techniques. In particular, the extremely small size of these sensors enables rapid, highly specific screening for hundreds of functionalities within a single, small, integrated microfluidics chip.

[1] Hong, S. R. Quake, Nat. Biotech. 2003, 21, 1179-1183.

The techniques here will be synergistically combined with high-resolution single-molecule microscopes, microfluidics and nanotube probes for in-situ biosignature detection. In a specific embodiment, a goal is to advance the SoA for fabricating nanoarray devices utilizing specific molecular recognition chemistry with DPN to the point where NASA will support full instrument development (e.g. via ASTID). Of course, there can be other variations, modifications, and alternatives.

We will provide four proof-of-principle demonstrations. Multicolor optical microscopy calibration standards will be created at sub-micrometer pitch based on molecular fluorophores and conjugated quantum dots, to enable multi-focal plane frame-adding with accuracy far below the optical diffraction limit. In addition, demonstrations of patterned nanoarrays on silanized glass cover slips using biotin-maleimide and $Ni^{2+}$-NTA ink chemistries for single-molecule detection of specific proteins will be provided and characterized. We will provide true biomarker sensors with extremely high specificity and sensitivity. In a specific embodiment, a first target will be an adenosine triphosphate (ATP) bio/chemiluminescence assay using the well-known luciferin/luciferase system. The resulting advances in optical readout capabilities and chemically specific templates for capturing sparse life signatures and precursors will lay the foundation for new kinds of exploratory missions.

We will use carbon nanotube AFM probes to reduce linewidths of patterned proteins and DNA apatmers on glass substrates with DPN from the 70 nm current $SoA^2$ to ~10 nm.

Devices written with silane-based inks can utilize glass, quartz and fused silica substrates to enable high-resolution, high-specificity optical readout with single-molecule sensitivity. In contrast, certain DPN technique uses alkylthiol molecules as inks written on opaque gold substrates. Interactions of immobilized proteins with other biomolecules are typically detected as changes in shape or height with standard Atomic Force Microscope (AFM) imaging, thereby restricting detection to large molecules or large quantities of small molecules. In addition, dust, nonspecific binding and other contamination sources can compromise such detection. Using nanotube probes, we desire to achieve detector spot sizes of ~10 nm with sensitivity to single-molecule capture and high-specificity. In contrast, commercial micro arrays, such as those made by Affymetrics of Santa Clara, have detector sizes 1000 times larger.[4] Such commercial micro arrays typically require $10^3$ to $10^5$ bindings for successful detection. Thus we expect to expand the areal density of our detectors $10^6$-fold while simultaneously improving sensitivity by at least 1000-fold over the SoA.

[2] H. Jung, C. K. Dalai, S. Kuntz, R. Shah, C. P. Collier, Nano Lett. 2004, 4, 1873-1879.
[4] Affymetries U133 Plus 2.0 Array has 11 um detector size.

Optical microscopes perform multicolor imaging with separate focal planes or detectors for each color. As the optical paths and aberrations are somewhat different for each color, it is difficult to map the relative position of the pixels in each color image to allow co-adding with an uncertainty less than $\lambda/2(\sim 300$ nm). This uncertainty limits the ability of observers to determine the proximity of objects tagged with different colored fluorophores. Precise nanopatterning of fluorophores of constant line width and known location can be used to reduce pixel mapping uncertainty of images taken with conventional multicolor microscopes to <20 nm (~$\lambda$/30), having immediate impact on the entire field of molecular biology and on the analysis of returned samples. By patterning conjugated quantum dots in a similar fashion, hybrid AlN/optical microscopes[3] can achieve pixel co-adding of separate focal lanes with an uncertainty <2 nm ($\lambda$/300): a 150-fold improvement in the SoA!

[3] J. M. Gerton, L. A. Wade. G. A. Lessard, Z. Ma. S. R. Quake. Phys. Rev. Lett., 2004, 93, 180801.

Finding convincing evidence or even the simplest or lire precursors on Mars, water, has taken decades of effort! Detecting life on other planetary bodies will prove still tougher in the absence of living creatures or even in the presence of existing sparse microbial life. In either case, it is reasonable to expect that remnants, or biosignatures, will be left behind. Typically, we expect that these biosignatures will be molecules embedded in cold ground environments and thereby shielded from UV exposure and active degrading chemistries. Unequivocal detection is likely to involve collecting samples from likely sites, sifting through them to find and sort out organic molecules, individually trapping them, and characterizing their chemical functionality. Only by the clear identification of a significant number of molecules with chemical functionality and/or structures too improbable to have been derived though processes not involving life, will we be able to declare success. Even recognizable organic molecules would have to be well characterized as reliable biomarkers for this result to be compelling, as extraordinary claims require extraordinary proof. For a mission to have a robust chance of successfully meeting this stringency test, the sensor array will have to include a large number ($10^2$-$10^3$) of highly specific functional tests, high capture efficiency and probably single-molecule sensitivity. We envision that the sensors for such a mission will be integrated with soft-lithography microfluidics, with typical sample volumes of 1 to Pico liters. This enables rapid sample testing of both binding and kinetics as the molecular diffusion time is very short at these distance scales. By using chemistries and sensor size compatible with SoA microfluidics, a single sub-nanoliter volume sample can be tested sequentially by hundreds of small, highly specific chemical sensors integrated on-chip. The study of many thousands of such samples can be conducted with minimal use of reagents.

Therefore, successful life detection will require combining a number of advanced technologies into extraordinarily small packages. Many of these advances are already being pursued vigorously: microfluidics for sample sorting, molecular resolution microscopes, rovers, etc. However the most significant gap remaining to be filled is a highly specific means for detection and characterization of biosignature chemical functionality by devices small enough to be compatible with sub-nanoliter samples. Advancing the technology enough to merit prototype instrument development will often require not just an advance in technology, but a clear demonstration of sensor capability to detect multiple sparse biosignatures with single-molecule sensitivity. As a significant step in this direction, we will develop and demonstrate proof-of-principle biomarker sensors for optical detection of single-molecule life signatures using silane-based dip-pen nanolithography on glass substrates suitable for multi-color optical imaging.

In a specific embodiment, DPN uses chemically modified AFM tips to pattern biological molecules on a surface of interest with nanoscale resolution, high registration alignment capabilities and control over biological activity of the resulting nanostructures.[1] Combinatorial chemical methods for fabricating DNA, peptide, and protein micro arrays have shown great promise in becoming powerful screening tools for genomics, proteomics and the pharmaceutical industry. Extension of this chemistry to the nanoscale will allow for reduced feature size and more densely packed features. The majority of DPN efforts described in the literature utilize a thiol-on-gold system where chemisorption of the thiol molecules on a gold surface is the driving force for ink transfer from the tip. As a result, the substrates are opaque and patterned sensors can only be observed from above, with low-resolution optical objectives, or with an AFM. This limits chemical discrimination if imaged topographically and limits sensitivity if imaged optically. Linewidths of chemical or biological materials patterned via this DPN technique are typically better than 100 nm, and in the best case as high as 15 nm, a length scale that is on the order of the dimensions of individual biological macromolecules.[1]

[1] D. S. Ginger, H. Zhang, C. A. Mirkin, Angew. Chem. Int. Ed. 2004, 30-45.

For our purposes, single-molecule optical imaging of nanoarrays necessitates the use of transparent glass, quartz or fused silica surfaces as the substrates for DPN. A successful genera/strategy for attaching biologically active molecules to glass, oxidized silicon or fused silica surfaces involves reaction with organofunctional silanes followed by subsequent coupling reactions of biomolecules to the pendant functional groups introduced on the surface.[2] This method is widely used for immobilizing biomolecules, including fabricating DNA, small-molecule and protein microarrays.[3] The success of this approach lies in its flexibility and generality; in principle, any biomolecule, including proteins, can be anchored to the silanized surface without loss of functionality, provided it can be appropriately modified.

[2] L. C. Shriver-Lake. Immobilized Biomolecules in Analysis, Cass. A. E. G., Ed.; Oxford University Press: Oxford, U.K., 1998; pp 1-14.
[3] M. C. Pirrung, Angew. Chem. Int. Ed. 2002, 41, 1276-1289.

We successfully combined dip-pen nanolithography with silane chemistry to pattern functional proteins in the present example. We have demonstrated nanoscale patterning of reactive mercaptopropyltrimethoxysilane on clean glass with DPN, followed by subsequent immobilization of fluorescently labeled streptavidin proteins from solution via covalent attachment of the small-molecule ligand biotin.[4] We have also recently achieved direct DPN writing of biotin on mercaptosilanized glass under ambient conditions by adding 0.1% (v/v) of the biocompatible surfactant Tween-20 to an ink consisting of a functionalized linker molecule (biotin-(polyethylene oxide)$_2$-maleimide).[5] In an embodiment, 70 nm wide lines of patterned biotin on silanized glass have been measured with friction force microscopy. Non-written areas were first passivated against non-specific adsorption of proteins with polyethylene glycol (PEG)-maleimide. We have also immobilized avidin-linked horseradish peroxidase enzymes to biotin-written areas on silanized glass and directly characterized enzymatic activity from the sites with a fluorescence-based assay involving conversion of fluorogenic substrate molecules to fluorescent products (not single-molecule fluorescence). Multiple array sites of peroxidase enzymes patterned with DPN (1×1 μm square) all showed similar pseudo first-order reaction kinetics, consistent with the Michaelis-Menten mechanism.

[4] Jung, R. Kulkarni, C. P. Collier, J. Am. Chem. Soc. 2003, 125, 12096-12097.
[5] H. Jung, C. K. Dalai, S. Kuntz.. R. Shah, C. P. Collier, Nano Lett. 2004, 4, 1873-1879.

Fabrication of streptavidin or avidin nanostructures built upon DPN patterning of biotin represents a general route toward molecular recognition-mediated protein immobilization at the nanoscale due to the ubiquity of biotin-tagged biomolecules. This includes capturing monoclonal antibodies, which further expands molecular recognition capabilities. We have demonstrated $Ni^{2+}$/nitilotriacetic acid (NTA)-maleimide based inks that bind to mercaptosilane functionalized $SiO_2$ surfaces for the reversible immobilization of biomolecules containing polyhistidine tags.

Here we propose utilizing carbon nanotube probes for the first time to perform DPN nanolithography of proteins and other biomolecules at 10 nm linewidths on glass coverslips: at least 5 times finer than the SoA. DPN linewidths are typically limited to at least two times the diameter of the stylus used for writing (i.e. ~70 nm for typical silicon AFM probes, carbon nanotube-based probes for AFM that achieved 5 Å image resolution (compared with ~10 nm resolution typical of silicon AFM probes)) along with methods that enable fabrication of such probes at rates compatible with their routine laboratory use.[6] In addition, a Teflon-coated probe compatible with immersion in liquids has been developed by Prof. Collier's group.[7] The compatibility of such a coating on a $Si_3N_4$ AFM tip with maleimide-biotin ink was demonstrated through nanopatterning on a silanized glass cover slip.

[6] L. A. Wade, I. R. Shapiro, Z. Ma, S. R. Quake, C. P. Collier, Nano Lett. 2004, 4, 725-731.
[7] M. J. Esplandiu. V. G. Bittner. K. P. Giapis, C. P. Collier. Nano Leu. 2004, 4, 1873-1879.

In the present example, we have propose the work for this task to be done at Caltech using our facilities. Nanotube probes will be grown using a custom CVD reactor and fabricated, then plasma-coated with a fluorocarbon polymer in an inductively coupled plasma reactor. We will use one of two AFMS (closed-loop BioScopes with Nanoscope IV controllers from Veeco Instruments) for nanolithography. Wet lab facilities are already in use for preparing substrates and inks. To perform optical readout we will utilize a conventional far-field optical microscope with an intensified CCD camera (Pentamax) that can detect single photons and a near-field optical microscope developed by us that consistently achieves <10 nm resolution.[8] FIG. 3Z shows a single Cy3 molecules attached to both ends of a short DNA oligomer imaged with this microscope. This is the first sub-10 nm resolution demonstrated by any optical microscope in which resolution and sensitivity are directly demonstrated through image separation of two objects rather than via inference from features in the point spread function of a small source. Of course, there can be other variations, modifications, and alternatives.

[8] M. Gerton. L. A. Wade, G. A. Lessard, Z. Ma, S. R. Quake. Phys. Rev. Lett., 2004, 93, 180801.

Two kinds of multicolor optical microscopy calibration standards will be created based on molecular fluorophores and conjugated quantum dots patterned with high precision at the nanoscale. Each device will incorporate at least two colors and will be used to calibrate microscope focal planes to enable multicolor image addition with <20 nm uncertainty for a conventional optical microscope, and <2 nm uncertainty for our Fluorescence Aperterless Near-Field Scanning Optical Microscope (FANSOM). In addition, nanoarrays fabricated using Biotinmaleimide and $Ni^{2+}$-NTA ink chemistries with DPN on silanized glass coverslips for single-molecule capture of specific proteins will be developed and characterized. Patterning of these nanoarrays will be done via nanotube probes. Technology maturation studies will include single-molecule capture/detection efficiency as a function of detector size and density.

In another example, we will develop biomarker sensors with high specificity and sensitivity. There are three possible strategies for such devices: 1) Uniquely bind a biosignature molecule through a specific chemical interaction; 2) Non-specifically bind a biomarker molecule and then interrogate it for specific functionalities; 3) Allow a freely diffusing biosignature molecule to interact with a patterned molecular circuit. As a first step, we will develop a nanoarray sensor that will detect the presence of ATP through bio/chemiluminescence. ATP is an essential metabolite in most living organisms on earth and is therefore a sensitive and specific biomarker. It is likely that extraterrestrial cold environments would preserve ATP for very long periods of time, since hydrolysis and other degradation pathways are thermally activated. On the other hand, ATP synthesis is energetically unfavorable. Hence, it can only be found in environments that at one time had living organisms; making it an ideal biosignature. We will immobilize streptavidin-linked firefly luciferase enzymes to biotin-written areas defined by DPN. The luciferin/luciferase assay has been used extensively to quantify living bacteria in samples by measuring intracellular ATP.[9] The reaction has a fast response time (milliseconds) and a large linear dynamic range for ATP. Because only ATP reacts with the luciferase enzyme to produce light, the sensitivity can be extremely high, with zero background theoretically. With an intensified CCD camera having single-photon detection sensitivity, ATP levels as low as $10^{-8}$ M have been imaged in a far-field optical microscope in milliseconds.[10] At this concentration, luminescent reactions involving single ATP molecules can be imaged in optical volumes of about $10^{-15}$ L or less. Such imaging volumes are easily obtained with both near-field and far-field optical techniques (e.g. Total Internal Reflection Fluorescence (TIRF) microscopy).

[9] A. Thore. A. Anschn. A. Lundin, S. Bergman, J. Clin. Microbiol. 1975, 1-8.
[10] Z. Wang. P. Haydon, F. S. Yeung, Anal. Chem. 2000, 72, 2001-2007.

We also established the efficacy of silane-based chemistry with DPN. This chemistry offers many diverse capabilities and enables optical readout of patterned arrays of functioning proteins on glass substrates. Note that we are not limited to patterned proteins as high affinity binding can also be afforded by DNA sequences that stereo-specifically fold to bind small molecules such as ATP. The mature and diverse capability of silane chemistry is already well established by the success of the biochip industry.

In this work, we propose to use nanotubes as dip-pen probes for the first time, thereby improving feature sizes by at least a factor of 5, to ~10 nm. In addition, we propose to develop spatial calibration standards for multicolor microscopes using fluorophores and conjugated quantum dots such that we can combine separate color images with pixel uncertainties of <20 nm for conventional optical microscopes and <2 nm for FANSOM. This exceeds the SoA by a factor of 15 for conventional microscopes and a factor of 150 for near-field microscopes.

By applying nanolithographic techniques to silane chemistry sensors, we have the opportunity to achieve an astonishing breakthrough in device size, capability and sensitivity. These nanoarray devices will reduce detector areal density by a factor of 1,000,000 and reduce the required sample for detection at least 1000 fold in comparison with the best commercial micro arrays currently available.

The size reduction is critical to ensure high binding/detection efficiency and fast readout. This also enables compatibility with SoA microfluidics devices. The resultant instrument mass savings (hardware and reagents) and the potential increase in device functionality is phenomenal: the difference being a device sitting under a microscope compared to one filling a room.

Finally, these technologies will be extended to develop a highly specific ATP biomarker sensor and to establish a new class of active sensors based on molecular circuitry. Together, the success in these proposed tasks will establish a major breakthrough in in-situ sensor technology.

We propose a series of synergistic steps that greatly extend the state-of-the-art in several fields: to develop calibration standards of immediate relevance to sample return missions, and to produce the first nano-array sensors with high density, specificity and single-molecule sensitivity. Finally we propose advances significant to the search for life on other planetary systems by developing several new and fundamentally different approaches to life detection and validating them through detection and functional interrogation of biosignatures at the single-molecule level. In doing so, we advance the SoA sufficiently to seriously propose developing prototype instruments upon completion of these tasks.

The proposed devices have direct application to in-situ life detection sensors, planetary protection, and the study of returned samples. In addition, such sensors will have important application to assessing astronaut health, particularly in regards to microgravity and radiation effects on their immune system. Of course, there can be other variations, modifications, and alternatives.

t is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method of processing one or more materials using a probe device, the method comprising:
    providing a substrate member baying a buttered fluid overlying the substrate member, the buffered fluid having one or more species mixed within the buffered fluid, the buffered fluid comprising a first pH range that makes the one or more species unreactive with each other and the substrate, the one or more species selected to be reactive to each other and the substrate or with only the substrate in a second pH range;
    suspending a probe device coupled to a tip region, the tip region having a determined spatial size;
    moving the probe device including the tip region toward a surface of the substrate member while maintaining the tip region immersed in the buffered fluid; applying an electrical bias on the probe device relative to a reference potential to cause the tip region to change in electrical characteristic so that the change in electrical characteristic is applied to a localized volume of the fluid of less than about 100 nm in diameter from the tip region of the probe device, creating a pH gradient within the localized volume, the pH gradient being within the second pH range, while the fluid outside the localized volume remains at about the first pH; and
    wherein a portion of the one or more species located within the localized volume reacts with each other and the substrate or with only the substrate to pattern the substrate and a portion of the one or more species located outside the localized volume does not react with each other and the substrate or with only the substrate.

2. The method of claim 1 wherein the electrical bias is a positive bias or a negative bias.

3. The method of claim 1 wherein the one or more species comprises a linker layer of molecules.

4. The method of claim 1 wherein the tip region comprises a conductive characteristic.

5. The method of claim 1 wherein the tip region comprises a coating thereon.

6. The method of claim 1 wherein the first pH of the buffered fluid is characterized by a pH of less than 7 or greater than 7.

7. The method of claim 1 wherein the portion of the one or more species within the localized volume reacts by causing an acidic characteristic within the localized volume.

8. The method of claim 1 wherein the tip is on and in contact with at least one of the one or more species.

9. The method of claim 1 wherein the substrate is made of a material selected from glass, quartz, ceramic, plastic, or semiconductor.

10. The method of claim 1 wherein the change in electrical characteristic forms one or more proton species within the localized volume.

11. The method of claim 1 wherein the steps of providing, suspending, moving, and applying are repeated for at least a second localized volume of less than about 100 nm in diameter from the tip region of the probe device.

* * * * *